US012766365B2

(12) United States Patent
Lee et al.

(10) Patent No.: US 12,766,365 B2
(45) Date of Patent: Oct. 20, 2026

(54) AUTOMATIC CYCLING WORKOUT DETECTION SYSTEMS AND METHODS

(71) Applicant: adidas AG, Herzogenaurach (DE)

(72) Inventors: Alan Lee, Montara, CA (US); Stephen John Black, Portland, OR (US); Jason Iijima, Portland, OR (US)

(73) Assignee: adidas AG, Herzogenaurach (DE)

( * ) Notice: Subject to any disclaimer, the term of this patent is extended or adjusted under 35 U.S.C. 154(b) by 289 days.

(21) Appl. No.: 18/420,269

(22) Filed: Jan. 23, 2024

(65) Prior Publication Data

US 2024/0173592 A1 May 30, 2024

Related U.S. Application Data

(62) Division of application No. 16/930,909, filed on Jul. 16, 2020, now Pat. No. 11,878,213, which is a (Continued)

(51) Int. Cl.
*A63B 24/00* (2006.01)
*G01S 5/00* (2006.01)
(Continued)

(52) U.S. Cl.
CPC ........ *A63B 24/0062* (2013.01); *G01S 5/0027* (2013.01); *G01S 19/19* (2013.01); (Continued)

(58) Field of Classification Search
CPC . A63B 24/00; A63B 24/0003; A63B 24/0006; A63B 24/0009; A63B 24/0012; (Continued)

(56) References Cited

U.S. PATENT DOCUMENTS

| | | | |
|---|---|---|---|
| 4,867,442 | A | 9/1989 | Matthews |
| 5,043,736 | A | 8/1991 | Darnell et al. |

(Continued)

FOREIGN PATENT DOCUMENTS

| | | | |
|---|---|---|---|
| CN | 101031101 | A | 9/2007 |
| DE | 3320502 | A1 | 12/1983 |

(Continued)

OTHER PUBLICATIONS

Baca, A., and Kornfeind, P., "Rapid Feedback Systems for Elite Sports Training," IEEE Pervasive Computing 5(4):70-76, (Oct. 2006).

(Continued)

*Primary Examiner* — Omkar A Deodhar

(74) *Attorney, Agent, or Firm* — Sterne, Kessler, Goldstein & Fox P.L.L.C.

(57) ABSTRACT

Devices, systems, and methods can be used including receiving motion data including comparing time-stamped speed data with predetermined cycling speed ranges, categorizing the speed data into portions of a minute that indicate each of the predetermined cycling speed ranges, determining portions of a minute indicate a cycling activity has begun, determining portions of a later minute indicate a cycling activity has paused or ended, confirming a minimum time inactive indicating that a cycling activity has ended, and determining that a minimum time active has elapsed between the indication a cycling activity has begun and indication a cycling activity has ended such that a cycling activity is categorized as a cycling workout.

10 Claims, 9 Drawing Sheets

Related U.S. Application Data division of application No. 15/849,226, filed on Dec. 20, 2017, now Pat. No. 10,751,571.

(51) Int. Cl.
*G01S 19/19* (2010.01)
*A63B 22/06* (2006.01)

(52) U.S. Cl.
CPC ... *A63B 22/0605* (2013.01); *A63B 2024/0065* (2013.01); *A63B 2024/0068* (2013.01)

(58) Field of Classification Search
CPC .............. A63B 24/0021; A63B 24/004; A63B 24/0046; A63B 24/005; A63B 24/0056; A63B 24/0062; A63B 24/0065; A63B 24/0068; A63B 24/0071; A63B 24/0075; A63B 24/0078; A63B 24/0081; A63B 24/0084; A63B 2024/0065; A63B 2024/0068; G01S 5/0027; G01S 19/19
See application file for complete search history.

(56) References Cited

U.S. PATENT DOCUMENTS

| | | | | |
|---|---|---|---|---|
| 5,291,301 | A | 3/1994 | Lee | |
| 5,334,974 | A | 8/1994 | Simms et al. | |
| 5,335,188 | A | 8/1994 | Brisson | |
| 5,400,254 | A | 3/1995 | Fujita | |
| 5,470,233 | A | 11/1995 | Fruchterman et al. | |
| 5,598,849 | A | 2/1997 | Browne | |
| 5,627,548 | A | 5/1997 | Woo et al. | |
| 5,702,323 | A | 12/1997 | Poulton | |
| 5,724,265 | A | 3/1998 | Hutchings | |
| 5,742,509 | A | 4/1998 | Goldberg et al. | |
| 5,751,245 | A | 5/1998 | Janky et al. | |
| 5,758,313 | A | 5/1998 | Shah et al. | |
| 5,767,795 | A | 6/1998 | Schaphorst | |
| 5,802,492 | A | 9/1998 | DeLorme et al. | |
| 5,825,327 | A | 10/1998 | Krasner | |
| 5,857,066 | A | 1/1999 | Wyche et al. | |
| 5,908,464 | A | 6/1999 | Kishigami et al. | |
| 5,910,799 | A | 6/1999 | Carpenter et al. | |
| 5,919,239 | A | 7/1999 | Fraker et al. | |
| 5,938,721 | A | 8/1999 | Dussell et al. | |
| 5,948,040 | A | 9/1999 | DeLorme et al. | |
| 5,976,083 | A | 11/1999 | Richardson et al. | |
| 6,002,982 | A | 12/1999 | Fry | |
| 6,009,138 | A | 12/1999 | Slusky | |
| 6,011,494 | A | 1/2000 | Watanabe et al. | |
| 6,013,007 | A | 1/2000 | Root et al. | |
| 6,032,108 | A | 2/2000 | Seiple et al. | |
| 6,135,951 | A | 10/2000 | Richardson et al. | |
| 6,198,431 | B1 | 3/2001 | Gibson | |
| 6,212,469 | B1 | 4/2001 | Knepper | |
| 6,246,362 | B1 | 6/2001 | Tsubata et al. | |
| 6,251,048 | B1 | 6/2001 | Kaufman | |
| 6,463,385 | B1 | 10/2002 | Fry | |
| 6,513,532 | B2 | 2/2003 | Mault et al. | |
| 6,582,342 | B2 | 6/2003 | Kaufman | |
| 6,585,622 | B1 | 7/2003 | Shum et al. | |
| 6,601,016 | B1 | 7/2003 | Brown et al. | |
| 6,605,038 | B1 | 8/2003 | Teller et al. | |
| 6,611,789 | B1 | 8/2003 | Darley | |
| 6,716,139 | B1 | 4/2004 | Hosseinzadeh-Dolkhani et al. | |
| 6,736,759 | B1 | 5/2004 | Stubbs et al. | |
| 6,741,927 | B2 | 5/2004 | Jones | |
| 6,746,370 | B1 | 6/2004 | Fleming et al. | |
| 6,746,371 | B1 | 6/2004 | Brown et al. | |
| 6,790,178 | B1 | 9/2004 | Mault et al. | |
| 6,798,378 | B1 | 9/2004 | Walters | |
| 6,823,036 | B1 | 11/2004 | Chen | |
| 6,837,827 | B1 | 1/2005 | Lee et al. | |
| 6,845,321 | B1 | 1/2005 | Kerns | |
| 6,853,955 | B1 | 2/2005 | Burrell et al. | |
| 6,872,077 | B2 | 3/2005 | Yeager | |
| 6,879,285 | B2 | 4/2005 | Nobukiyo | |
| 6,882,955 | B1 | 4/2005 | Ohlenbusch et al. | |
| 6,918,858 | B2 | 7/2005 | Watterson et al. | |
| 6,921,351 | B1 | 7/2005 | Hickman et al. | |
| 7,062,225 | B2 | 6/2006 | White | |
| 7,070,539 | B2 | 7/2006 | Brown et al. | |
| 7,172,530 | B1 | 2/2007 | Hercules | |
| 7,216,034 | B2 | 5/2007 | Vitikainen et al. | |
| 7,217,224 | B2 | 5/2007 | Thomas | |
| 7,220,220 | B2 | 5/2007 | Stubbs et al. | |
| 7,251,454 | B2 | 7/2007 | White | |
| 7,254,516 | B2 | 8/2007 | Case, Jr. et al. | |
| 7,257,517 | B2 | 8/2007 | Shitan | |
| 7,292,867 | B2 | 11/2007 | Werner et al. | |
| 7,428,471 | B2 | 9/2008 | Darley et al. | |
| 7,428,472 | B2 | 9/2008 | Darley et al. | |
| 7,466,992 | B1 | 12/2008 | Fujisaki | |
| 7,480,512 | B2 | 1/2009 | Graham et al. | |
| 7,518,054 | B2 | 4/2009 | Mckinney et al. | |
| 7,519,327 | B2 | 4/2009 | White | |
| 7,603,255 | B2 | 10/2009 | Case, Jr. et al. | |
| 7,643,895 | B2 | 1/2010 | Gupta et al. | |
| 7,648,463 | B1 | 1/2010 | Elhag et al. | |
| 7,670,263 | B2 | 3/2010 | Ellis et al. | |
| 7,706,815 | B2 | 4/2010 | Graham et al. | |
| 7,717,827 | B2 | 5/2010 | Kurunmäki et al. | |
| 7,766,794 | B2 | 8/2010 | Oliver et al. | |
| 7,771,320 | B2 | 8/2010 | Riley et al. | |
| 7,805,149 | B2 | 9/2010 | Werner et al. | |
| 7,805,150 | B2 | 9/2010 | Graham et al. | |
| 7,921,163 | B1 | 4/2011 | Odell et al. | |
| 7,951,046 | B1 | 5/2011 | Barber, Jr. | |
| 7,985,164 | B2 | 7/2011 | Ashby | |
| 8,001,472 | B2 | 8/2011 | Gilley et al. | |
| 8,388,554 | B2 | 3/2013 | Oshima et al. | |
| 9,392,941 | B2 | 7/2016 | Powch et al. | |
| 9,500,464 | B2 | 11/2016 | Coza | |
| 9,712,629 | B2 | 7/2017 | Molettiere et al. | |
| 9,767,257 | B2 | 9/2017 | McBrearty et al. | |
| 9,950,236 | B1 | 4/2018 | Jooste et al. | |
| 10,143,405 | B2 * | 12/2018 | Jayalath | A61B 5/0022 |
| 10,751,571 | B2 | 8/2020 | Lee et al. | |
| 11,878,213 | B2 | 1/2024 | Lee et al. | |
| 2001/0027375 | A1 | 10/2001 | Machida et al. | |
| 2002/0049535 | A1 | 4/2002 | Rigo et al. | |
| 2002/0094776 | A1 | 7/2002 | Pulver | |
| 2002/0102988 | A1 | 8/2002 | Myllymaki | |
| 2002/0107433 | A1 | 8/2002 | Mault | |
| 2003/0091964 | A1 | 5/2003 | Yeager | |
| 2003/0100315 | A1 | 5/2003 | Rankin | |
| 2003/0171189 | A1 | 9/2003 | Kaufman | |
| 2003/0191578 | A1 | 10/2003 | Paulauskas et al. | |
| 2003/0208409 | A1 | 11/2003 | Mault | |
| 2003/0224337 | A1 | 12/2003 | Shum et al. | |
| 2003/0229446 | A1 | 12/2003 | Boscamp et al. | |
| 2004/0046692 | A1 | 3/2004 | Robson et al. | |
| 2004/0102931 | A1 | 5/2004 | Ellis et al. | |
| 2004/0116784 | A1 | 6/2004 | Gavish | |
| 2004/0199056 | A1 | 10/2004 | Husemann et al. | |
| 2004/0203789 | A1 | 10/2004 | Hammond et al. | |
| 2004/0203873 | A1 | 10/2004 | H. Gray | |
| 2004/0240946 | A1 | 12/2004 | Haun | |
| 2004/0249846 | A1 | 12/2004 | Randall et al. | |
| 2005/0075214 | A1 | 4/2005 | Brown et al. | |
| 2005/0079905 | A1 | 4/2005 | Martens | |
| 2005/0096933 | A1 | 5/2005 | Collins et al. | |
| 2005/0121504 | A1 | 6/2005 | Sanders et al. | |
| 2005/0124463 | A1 | 6/2005 | Yeo et al. | |
| 2005/0172311 | A1 | 8/2005 | Hjelt et al. | |
| 2005/0177059 | A1 | 8/2005 | Koivumaa et al. | |
| 2005/0195094 | A1 | 9/2005 | White | |
| 2005/0197063 | A1 | 9/2005 | White | |
| 2005/0209050 | A1 | 9/2005 | Bartels | |
| 2005/0209887 | A1 | 9/2005 | Pollner | |
| 2005/0266961 | A1 | 12/2005 | Shum et al. | |
| 2005/0287499 | A1 | 12/2005 | Yeager | |
| 2006/0025282 | A1 | 2/2006 | Redmann | |
| 2006/0063980 | A1 | 3/2006 | Hwang et al. | |

(56) References Cited

U.S. PATENT DOCUMENTS

| | | | | |
|---|---|---|---|---|
| 2006/0082472 | A1 | 4/2006 | Adachi et al. | |
| 2006/0136173 | A1 | 6/2006 | Case et al. | |
| 2006/0156356 | A1 | 7/2006 | Sato et al. | |
| 2006/0189360 | A1 | 8/2006 | White | |
| 2006/0240865 | A1 | 10/2006 | White | |
| 2006/0252602 | A1 | 11/2006 | Brown et al. | |
| 2007/0135225 | A1 | 6/2007 | Nieminen et al. | |
| 2007/0208531 | A1 | 9/2007 | Darley et al. | |
| 2007/0219059 | A1 | 9/2007 | Schwartz et al. | |
| 2007/0232455 | A1 | 10/2007 | Hanoun | |
| 2007/0265138 | A1 | 11/2007 | Ashby | |
| 2007/0287596 | A1 | 12/2007 | Case et al. | |
| 2008/0051201 | A1 | 2/2008 | Lore | |
| 2008/0051993 | A1 | 2/2008 | Graham et al. | |
| 2008/0058971 | A1 | 3/2008 | Graham et al. | |
| 2008/0059064 | A1 | 3/2008 | Werner et al. | |
| 2008/0076637 | A1 | 3/2008 | Gilley et al. | |
| 2008/0096726 | A1 | 4/2008 | Riley et al. | |
| 2008/0200310 | A1 | 8/2008 | Tagliabue | |
| 2008/0214357 | A1 | 9/2008 | Farinelli et al. | |
| 2008/0319661 | A1 | 12/2008 | Werner et al. | |
| 2009/0047645 | A1 | 2/2009 | Dibenedetto et al. | |
| 2009/0048044 | A1 | 2/2009 | Oleson et al. | |
| 2009/0048070 | A1 | 2/2009 | Vincent et al. | |
| 2009/0069156 | A1 | 3/2009 | Kurunmäki et al. | |
| 2009/0144639 | A1 | 6/2009 | Nims et al. | |
| 2009/0233770 | A1 | 9/2009 | Vincent et al. | |
| 2009/0292178 | A1 | 11/2009 | Ellis et al. | |
| 2010/0042427 | A1 | 2/2010 | Graham et al. | |
| 2010/0045463 | A1 | 2/2010 | Bradley et al. | |
| 2010/0060586 | A1 | 3/2010 | Pisula et al. | |
| 2010/0062818 | A1 | 3/2010 | Haughay, Jr. et al. | |
| 2010/0069203 | A1 | 3/2010 | Kawaguchi et al. | |
| 2010/0088023 | A1 | 4/2010 | Werner | |
| 2010/0129780 | A1 | 5/2010 | Homsi et al. | |
| 2010/0137106 | A1 | 6/2010 | Oshima et al. | |
| 2010/0184563 | A1 | 7/2010 | Molyneux et al. | |
| 2010/0184564 | A1* | 7/2010 | Molyneux | A43B 5/02 482/1 |
| 2010/0216601 | A1 | 8/2010 | Saalasti et al. | |
| 2010/0292050 | A1 | 11/2010 | Dibenedetto et al. | |
| 2010/0292599 | A1 | 11/2010 | Oleson et al. | |
| 2010/0292600 | A1 | 11/2010 | DiBenedetto et al. | |
| 2010/0311544 | A1 | 12/2010 | Robinette et al. | |
| 2011/0082641 | A1 | 4/2011 | Werner et al. | |
| 2011/0087137 | A1 | 4/2011 | Hanoun | |
| 2011/0098156 | A1 | 4/2011 | Ng et al. | |
| 2012/0015779 | A1 | 1/2012 | Powch et al. | |
| 2012/0254934 | A1 | 10/2012 | McBrearty et al. | |
| 2013/0053990 | A1* | 2/2013 | Ackland | G06Q 30/02 700/91 |
| 2013/0158686 | A1 | 6/2013 | Zhang et al. | |
| 2014/0142459 | A1* | 5/2014 | Jayalth | A61B 5/0022 600/547 |
| 2014/0257533 | A1 | 9/2014 | Morris et al. | |
| 2014/0266160 | A1 | 9/2014 | Coza | |
| 2014/0278229 | A1* | 9/2014 | Hong | H04W 4/027 702/160 |
| 2015/0050972 | A1 | 2/2015 | Sarrafzadeh et al. | |
| 2016/0023045 | A1 | 1/2016 | Dalebout | |
| 2017/0039480 | A1 | 2/2017 | Bitran et al. | |
| 2017/0056722 | A1 | 3/2017 | Singh et al. | |
| 2017/0239523 | A1 | 8/2017 | Cheng et al. | |
| 2017/0348562 | A1* | 12/2017 | Jung | A63B 24/0062 |
| 2018/0056126 | A1* | 3/2018 | Eastman | G06V 40/23 |
| 2018/0156925 | A1* | 6/2018 | Johns | H04W 4/021 |
| 2018/0161625 | A1 | 6/2018 | Miyasaka | |
| 2018/0256078 | A1 | 9/2018 | Vaterlaus | |
| 2018/0303381 | A1 | 10/2018 | Todd et al. | |
| 2018/0338709 | A1 | 11/2018 | Krans et al. | |
| 2018/0352534 | A1 | 12/2018 | Blahnik et al. | |
| 2019/0038938 | A1 | 2/2019 | Nagasaka et al. | |
| 2019/0192911 | A1 | 6/2019 | Quast et al. | |
| 2021/0096267 | A1* | 4/2021 | Johns | H04W 4/02 |

FOREIGN PATENT DOCUMENTS

| | | | |
|---|---|---|---|
| EP | 1530986 | A2 | 5/2005 |
| EP | 1530986 | A3 | 6/2005 |
| GB | 2257558 | A | 1/1993 |
| GB | 2372114 | A | 8/2002 |
| JP | S63144286 | A | 6/1988 |
| JP | H10329452 | A | 12/1998 |
| JP | 2002248187 | A | 9/2002 |
| JP | 2002288381 | A | 10/2002 |
| JP | 2004247954 | A | 9/2004 |
| JP | 2007312246 | A | 11/2007 |
| WO | WO-2007069014 | A1 | 6/2007 |
| WO | WO-2008119266 | A1 | 10/2008 |

OTHER PUBLICATIONS

Basari, B., et al., “Field Measurement on Simple Vehicle-mounted Antenna System Using a Geostationary Satellite,” IEEE Transactions on Vehicular Technology 59(9):4248-4255, (Dec. 2010).

Cavallo, F., et al., “A Step Toward GPS/INS Personal Navigation Systems: Real-time Assessment of Gait by Foot Inertial Sensing,” IEEE/RSJ International Conference on Intelligent Robots and Systems, 1187-1191, (Dec. 2005).

Extended European Search Report for European Application No. 11173217.8, Mailed Feb. 26, 2016, 6 Pages.

Garmin Garmin International, Inc., “NAVTALK Cellular Phone/GPS Receiver Owner’s Manual and Reference Guide,” Corporation, (1999-2000), 64 Pages.

Garmin International, Inc., “GPSIII, Garmin Owner’s Manual & Reference,” Garmin Corp., Kansas, USA, Aug. 1997, 100 pages.

Garmin International, Inc., “NAVTALK Cellular Phone/GPS Receiver Owner’s Manual and Reference Guide,” Garmin Corporation, 1999-2000, 128 pages.

Garmin Ltd., NavTalk GSM Specification, Product Information, (2002), 6 pages.

GPSII, Garmin Owner’s Manual & Reference, Garmin Corporation, Kansas, United States, 108 pages (Aug. 1996).

Li, M., and Zhang, W., “Hierarchical Cluster Analysis on Coolmax/Cotton Double-faced Effect Knitted Fabric’s Subjective Sensations in Different Sports Conditions,” International Symposium on Information Science and Engieering, 1:622-625, (2008).

Llosa, J., et al., “Design of a Motion Detector to Monitor Rowing Performance Based on Wireless Sensor Networks,” Intelligent Networking and Collaborative Systems, IEEE, 397-400 (2009).

Lodha, S.K., et al., “Consistent Visualization and Querying of GIS Databases by A Location-aware Mobile Agent,” Computer Graphics International, 248-253 (Jul. 2003).

Losada, M.A., et al., “OISTI (An Oral-Interface System to Provide Tourist-Information inside a Car),” Information Technology: International Conference on Coding and Computing, 373-377 (Apr. 2001).

Magellan Systems Corporation: “Magellan GPS, NAV DLX-10 User Guide,” (1995), 91 pages.

Magellan Systems Corporation, “Magellen GPS Satellite Navigator Reference Guide Trailblazer XL,” 1995pp. 1-78.

Malkinson, T., “Current and Emerging Technologies in Endurance Athletic Training and Race Monitoring,” Science and Technology for Humanity (TIC-STH), 2009 IEEE Toronto International Conference, 581-586, (2009).

Mann, S., “WearCam1 (The wearable camera): personal imaging systems for long-term use in wearable tetherless computer-mediated reality and personal photo/videographic memory prosthesis,” Wearable Computers, 1998. Digest of Papers; Second International Symposiumon, Oct. 19-20, 1998, pp. 124-131.

Mehaffey, et al., “Garmin’s NavTalk Cell Phone and Road Map GPS Product Review,” Revision 2, Nov. 2, 1999; 5 Pages.

Sawhney, N., and Schmandt, C., “Speaking and Listening on the Run: Design for Wearable Audio Computing,” Speech Interface Group, MIT Media Laboratory 8 pages, (Oct. 1998).

Silva, S.F., and Catarci, T., “Homogeneous Access to Temporal Data and Interaction Histories in Visual Interface for Databases,” User Interfaces to Data Intensive Systems, 108-117, (1999).

(56) References Cited

OTHER PUBLICATIONS

Sun, W., and Amin, M.G., “A Self-coherence Anti-jamming GPS Receiver,” IEEE Transactions on Signal Processing 53(10):3910-3915, (Oct. 2005).
Svendsen, A.S.C., and Gupta, I.J., “Adaptive Antenna for Handheld GPS Receivers,” Position Location and Navigation Symposium IEEE, 436-442, (May 2010).
Waegli, A., et al., “Redundant MEMS-IMU integrated with GPS for Performance Assessment in Sports,” IEEE/ION Position, Location and Navigation Symposium, pp. 1260-1268, (2008).

* cited by examiner

AUTOMATIC CYCLING WORKOUT DETECTION SYSTEMS AND METHODS

CROSS-REFERENCE TO RELATED APPLICATION

This application is a divisional of U.S. patent application Ser. No. 16/930,909, filed Jul. 16, 2020, which is a divisional of U.S. patent application Ser. No. 15/849,226, filed Dec. 20, 2017, now U.S. Pat. No. 10,751,571, issued Aug. 5, 2020, each of which is incorporated herein in its entirety by reference thereto.

FIELD OF THE INVENTION

Embodiments of the present invention generally relate to methods and systems related to health and wellness tracking. More particularly, embodiments of the present invention relate to methods and systems for automatically detecting various activities, including cycling activity, cycling workouts, and cycling commuting.

BACKGROUND OF THE INVENTION

Athletic activity and general wellness activity can take many forms-some individuals prefer to engage in team athletic activities such as, for example, soccer or basketball, while other individuals prefer to engage in individual athletic activities such as, for example, cycling, running, or skiing. Regardless of whether the activity is a team or individual activity, it is becoming more and more common for individuals to actively track their performance. Further, renewed focus on health and wellness systems encourage individuals to track more passive types of activity, such as cycling commuting, or taking a walk on a lunch break, for example.

In this respect, it is advantageous to provide systems and methods that will track and provide an individual with analytical, quantitative, and qualitative understanding of health and wellbeing. Providing systems and methods that can automatically track and categorize different types of activity is further advantageous, as they would not require intense engagement from an individual with a complicated interface, for example. That is, activity tracking applications may be complex, including various features and information an individual does not wish to track. Additionally, individuals may wish to use a particular device to track everything, without needing multiple applications or devices. On the other hand, personal choice may contribute to an individual wishing to use a particular data source, for example, because they enjoy a particular device or application. A single application that may aggregate data and information from multiple sources is thus further advantageous.

BRIEF SUMMARY OF THE INVENTION

Embodiments of the present disclosure relate to devices, systems, and methods that can be used to track an individual's activity and health related data, automatically detect cycling activity and cycling workouts, provide feedback, encouragement, etc.

Some embodiments are directed to a health and fitness monitoring system for automatically detecting a cycling workout. In some embodiments, the system includes an electronic device to be carried by the individual and connected to a software platform, the electronic device including a GPS receiver connected to the software platform configured to receive a GPS data stream including time-stamped speed data, a processor connected to the software platform, and a memory. In some embodiments, the processor is configured to process the GPS data stream into a speed segment data stream indicating a speed range for a given duration, and is configured to organize the speed segment data stream into a time-stamped bucket (e.g., a minute bucket) including duration values for a plurality of cycling-specific speed classifications. In some embodiments, the memory is configured to store time stamped minute buckets in an array, and the processor is further configured to determine whether a portion of the array includes a minute bucket that indicates an individual engaged in a cycling speed based on the duration values for the plurality of cycling-specific speed classifications. The processor may be configured to detect patterns that indicate an individual is engaged in cycling.

In some embodiments, the software module includes cycling-specific speed classifications based on a lower cycling speed threshold, an upper cycling speed threshold, and a possible cycling speed threshold higher than the upper cycling speed threshold. In some embodiments, the thresholds define speed classifications of speeds slower than cycling speed, cycling speed, faster than cycling speed, and too fast to be cycling speed. In some embodiments, the software module further defines a candidate start density threshold defined by a percentage of a speed classification a minute bucket must reach in order for the processor to consider the minute bucket to be a candidate for the start of cycling. In some embodiments, the candidate start density threshold is cycling speed for about 60% of a minute bucket. In some embodiments, the software module further defines a minimum time active such that an individual may input, through a user interface on the electronic device, a desired threshold for the software module to consider a cycling activity after a candidate start density threshold minute. In some embodiments, the software platform automatically adjusts the user input minimum time active such that the user input minimum time active is longer than the minimum time active used by the software module.

Some embodiments are directed to a health and fitness monitoring method for automatically detecting a cycling activity. In some embodiments, the method includes receiving a GPS data stream including time-stamped speed data for an individual, processing via a processor the GPS data stream into a data stream of speed segments, organizing via the processor the data stream of speed segments into minute buckets to be stored in a memory as an array, determining via the processor whether the array entry indicates a candidate start density threshold, and determining via the processor whether a maintenance average density threshold is achieved across a sequence of the array entries such that it is determined that the individual is engaging in cycling activity.

In some embodiments, the method includes determining an array entry indicates an inactive density threshold, determining whether an minimum time inactive has elapsed after the array entry indicating an inactive density threshold such that it is determined that a cycling activity has ended, confirming whether a minimum time active elapsed between candidate start density threshold and the end of the cycling activity such that the cycling activity is categorized as a cycling workout. In some embodiments, the method includes resetting the array if a minimum time inactive is reached. In some embodiments, the method includes resetting the array if a threshold portion of the array indicates speed segments too fast to be categorized as cycling.

Some embodiments are directed to a health and fitness monitoring method for automatically detecting a cycling workout. In some embodiments, the method includes comparing time-stamped speed data with predetermined cycling speed ranges, categorizing the speed data into portions of a minute that indicate each of the predetermined cycling speed ranges, determining portions of a minute indicate a cycling activity has begun, and determining portions of a later minute indicate a cycling activity has paused or ended, and confirming a minimum time inactive indicating that a cycling activity has ended, determining that a minimum time active has elapsed between the indication a cycling activity has begun and indication a cycling activity has ended such that a cycling activity is categorized as a cycling workout.

In some embodiments, the minimum time active is configured by an individual in a user interface. In some embodiments, the categorizing of the speed data depends on speed classifications indicating speeds slower than cycling speed, cycling speed, faster than cycling speed, and too fast to be cycling speed.

Some embodiments are directed to a health and fitness monitoring method for automatically detecting a cycling activity. In some embodiments, the method includes receiving a speed data stream at a background distance filter setting and a background accuracy filter setting, determining an individual is likely engaged in a cycling activity, adjusting the distance filter setting to a tracking distance filter setting, adjusting the accuracy filter setting to a tracking accuracy filter setting, determining an individual is not engaged in a cycling activity, and reverting to the background distance filter setting and background accuracy filter setting. In some embodiments, the speed data stream is a GPS speed data stream. In some embodiments, determining an individual is likely engaged in a cycling activity includes receiving data corresponding to speed of the individual, categorizing the speed of the individual as less than cycling activity, more than cycling activity, cycling activity, and possibly cycling activity, determining, based on the categorization, whether the individual is engaging in cycling activity, and determining, based on the categorization, whether a cycling activity should be categorized as a cycling workout. In some embodiments, determining an individual is likely engaged in a cycling activity includes converting the data corresponding to the speed of the individual into time-stamped speed segments, organizing the time-stamped speed segments into speed characterizations for a portion of a given minute, and comparing the speed characterizations of a given minute such that if a significant portion of the minute falls into a cycling speed characterization, identifying that a cycling activity is occurring at that minute. In some embodiments, the method includes determining that a minimum time active has elapsed between determining the individual has likely engaged in a cycling activity and determine an individual is not engaged in a cycling activity, and indicating that a cycling workout has occurred.

BRIEF DESCRIPTION OF THE DRAWINGS/FIGURES

The accompanying figures, which are incorporated herein, form part of the specification and illustrate embodiments of the present invention. Together with the description, the figures further serve to explain the principles of and to enable a person skilled in the relevant arts to make and use the invention.

DETAILED DESCRIPTION OF THE INVENTION

The present invention will now be described in detail with reference to embodiments thereof as illustrated in the accompanying drawings. References to "one embodiment", "an embodiment", "an example embodiment", "some embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The term "invention" or "present invention" as used herein is a non-limiting term and is not intended to refer to any single embodiment of the particular invention but encompasses all possible embodiments as described in the application.

Various aspects of the present invention, or any parts or functions thereof, may be implemented using hardware, software, firmware, non-transitory tangible computer readable or computer usable storage media having instructions stored thereon, or a combination thereof, and may be implemented in one or more computer systems or other processing systems.

The present invention generally relates to methods and systems that collect, store, and communicate data to an individual related to an experience, such as a "discovery experience," "discovery," or "self-experiment." Details regarding discoveries and experiences can be found in co-pending and co-owned application U.S. application Ser. No. 15/456,272, filed Mar. 10, 2017, which is incorporated herein by reference for all purposes.

Figure 1:
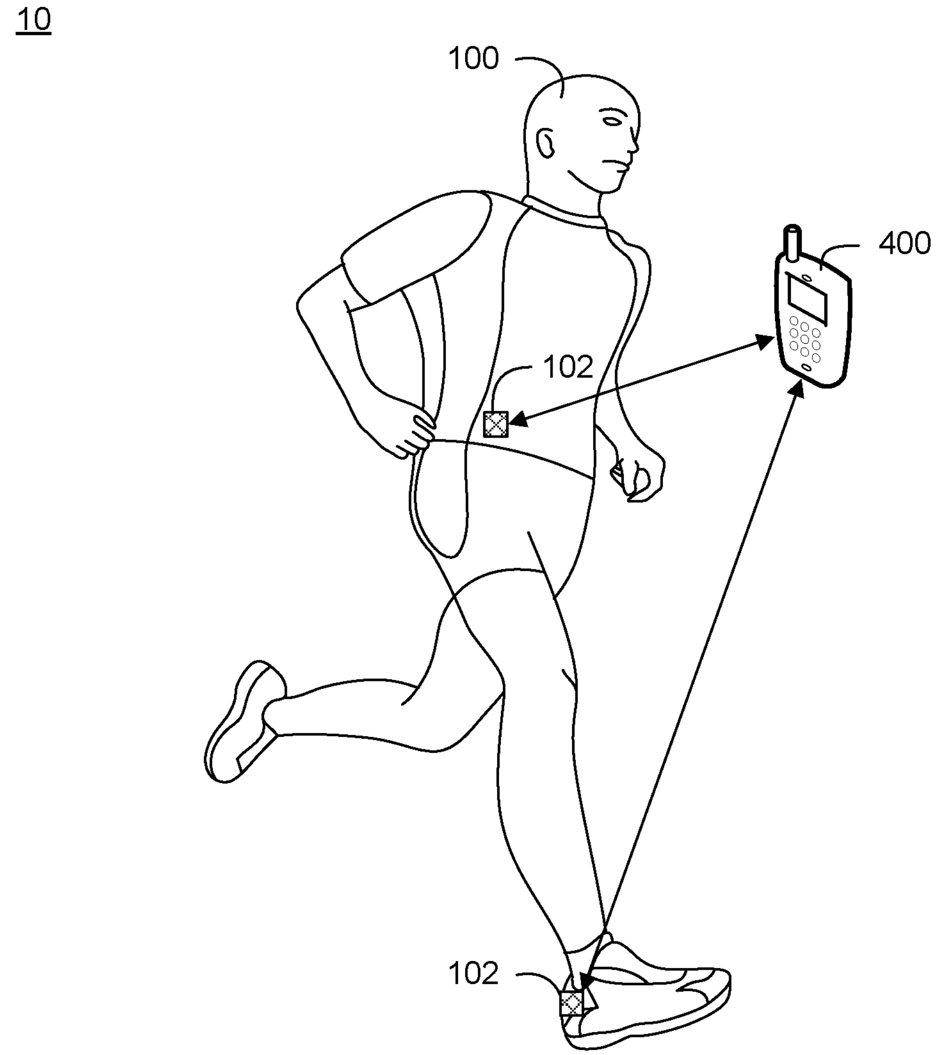
FIG. 1 is an illustration of a system using one or more sensor modules according to various embodiments.

FIG. 1 illustrates an exemplary system 10 that uses sensor modules 102 and electronic device 400, such as a mobile phone, which may include a sensor module 102. While not specifically shown here, sensor modules could also be embedded in items of apparel (e.g., headbands, hats, wristbands, gloves, jackets, wetsuits, swimsuits, and vests, to name a few non-limiting examples). According to various embodiments, sensor modules 102 may be embedded either removably or permanently in an article of apparel (e.g., clothing or shoes) or in an accessory or piece of athletic equipment (e.g., balls, bats, pads, racquets, clubs, bags, belts, headbands, and wristbands, to name a few non-limiting examples). For instance, in some embodiments sensor devices may be embedded or affixed to an item via, e.g., sewing, gluing, a pocket, integration during manufacturing, to name a few non-limiting examples. Embodiments additionally include use of sensor modules 102 to monitor sleep. In such embodiments, the sensor modules 102 may be attached to, or integrated with sleep garments such as pajamas or sleeping pants with the sensor devices located, for instance, in a waist area or chest area of the sleep garment. For sleep monitoring, sensor modules 102 could be configured to measure night movements, heart rate, and breathing and this data could be processed and used to generate a sleep quality indication.

Suitable portable fitness or activity monitoring software applications may include, for example, the features of those disclosed in commonly owned U.S. Pat. No. 9,392,941, which is incorporated herein by reference in its entirety.

The systems and methods may be effected through software platform 1000 (which may be included in system 10, sensor module 102, electronic device 400, etc.), containing software modules, for example. In some embodiments, fewer modules may be included, or additional modules may be included. In some embodiments, modules may be removed or added, for example through a network connection. Programming data may include software platform, and include various modules. Each of the components in sensor module 102, for example, or electronic device 400, may feed the modules data that the modules use to formulate a response. In other embodiments, the systems and methods may be effected through software platform 1000 in an electronic device 400 in addition to or instead of in system 10. In some embodiments, software platform may communicate with a third party software platform 2000, or an operating system software platform 3000, and exchange and or utilize data streams or settings from one or more additional software platforms.

Once individual 100 enables data enabling on software platform 1000, the system 10 may be configured to automatically perform actions related to data collection. In some embodiments, system 10 will then be configured to automatically track or log workouts or athletic activities that individual 100 performs. In some embodiments, system 10 may automatically determine when individual 100 begins a long walk, a run, a bike ride, bike commute, etc. In some embodiments, workouts may include the time it takes individual 100 to walk to and from the workout. In some embodiments, workouts may omit exactly when individual 100 starts or finishes just the running part of a workout, for example. In some embodiments, the workout duration is the start to finish duration, and could include time for breaks, walking, running, cycling, and the like.

In some embodiments, system 10 may automatically log a workout if individual 100 is in a particular location (e.g., a gym, track, arena, athletic complex, etc.) for a prolonged period of time (e.g., about 20-30 minutes). In some embodiments, individual 100 may enable this feature of system 10 by tagging a location while manually adding a workout for the first time. In some embodiments, when individual 100 manually adds a workout, individual 100 will be able to specify that the same workout should be logged when individual 100 visit the same location. In some embodiments, individual 100 may have the option to customize the minimum amount of time for an activity to be logged as a workout. In some embodiments, system 10 may set a default time, e.g., 10 minutes, but individual 100 may alter this threshold.

In some embodiments, system 10 may default to automatically tracking workouts after a period of time, e.g., 10 minutes, which may be altered by individual 100. In some embodiments, system 10 may automatically stop counting a workout if individual 100 takes a break for a predetermined duration. In some embodiments, individual 100 may configure which data source tracks a specific metric, or exclude certain data sources from tracking certain metrics. In some embodiments, additional individual 100 specific settings may be available. For example, individual may be able to set units for length, weight, etc. In some embodiments, individual 100 may be able to configure and enable notifications system 10 will send, e.g., "push notifications" to individual 100 electronic device 400. These notifications may remind individual 100 of important events. These notifications may include tips, insights, workout summaries, new recommended discovery experiences, discovery experience reminders, etc. In some embodiments, individual 100 may configure system 10 permissions to access data such as location, motion, camera, and photo library data. In some embodiments, individual 100 may specify whether downloads (video, audio, photo) happen over cellular data and WiFi or just WiFi.

In some embodiments, GPS speed may be utilized to detect cycling workouts and active minutes. As used herein, cycling active minutes is defined as the sum of the minutes that individual 100 cycled throughout the day (e.g., on Apr. 9, 2017, the individual cycled for a total of 47 minutes). Active minutes may include events such as commuting, cycling for leisure, or a cycling workout, for example. In some embodiments, separate categories of active minutes, such as active cycling workout minutes are contemplated.

In some embodiments, as used herein, a cycling workout may be a concentrated session of cycling defined by user input (e.g., at least 15 minutes long) along with algorithmic parameters (e.g., how much of any individual minute must include automatically detected cycling speeds, also referred to as cycling active density). For example, in some embodiments, the algorithm may define a cycling active density of greater than about 60%. In some embodiments, the algorithm may define a rest duration threshold, e.g., activity with no stops longer than about 6 minutes. In order to obtain accurate cycling workout information, in some embodiments, the system 10 identifies workout duration to the resolution of whole minutes.

As described herein, system 10 overcomes several disadvantages of using accelerometer signals, or GPS speed to detect cycling activity. For example, slow cycling is generally about the same speed as fast running (~6:30 minutes/mile pace). Also, fast cycling is about the same speed as slow automotive or other transit. Moreover, as an individual cycles uphill or downhill, the "normal" range of cycling speed varies. GPS speed alone may not readily identify a difference between an individual leaving a commuter train with their bike and then cycling as compared to an individual in a car slowing down hitting congestion.

Furthermore, GPS tends to have a heavy drain on the user's electronic device battery, e.g., mobile phone. As described herein, system 10 overcomes several of these drawbacks and achieves a balance in accurately automatically detecting cycling while minimizing battery drain, and to differentiate between neighboring classifications such as running and automotive speeds through particular algorithmic innovations within software platform 1000 and specific hardware component structure.

Software platform 1000 may be generally structured to link functions, such as first time use, goal definitions, discovery library, home, discovery content, etc. Additionally, software platform 1000 may include a profile, settings/preferences, and a link to an online shopping application, and social applications, for example.

Figure 2:
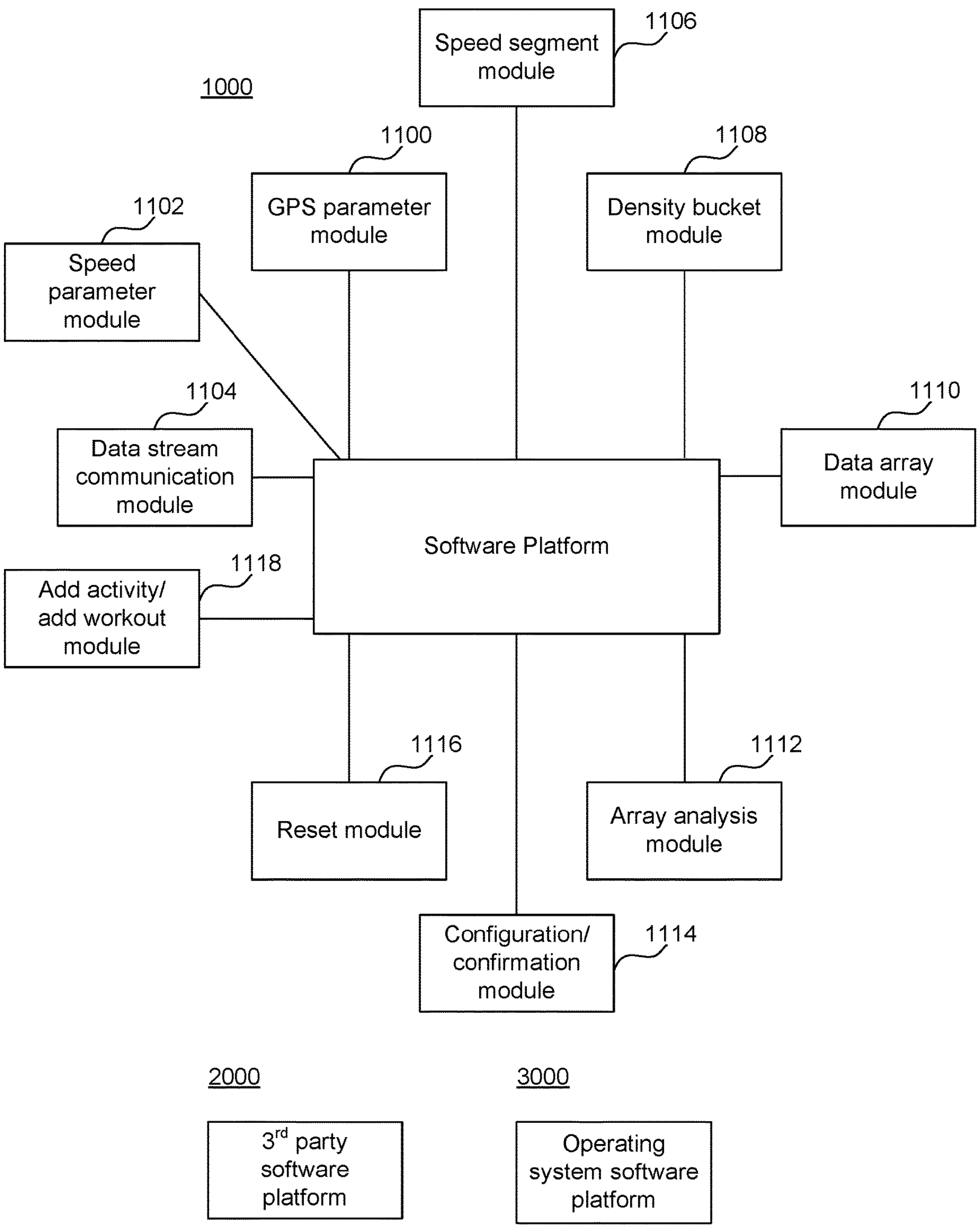
FIG. 2 is a conceptual relationship illustration of a software platform according to an example embodiment.

As shown in FIG. 2, software platform 1000 may include several modules, such as GPS parameter module 1100, speed parameter module 1102, data stream communication module 1104, speed segment module 1106, density bucket module 1108, data array module 1110, array analysis module 1112, confirmation module 1114, reset module 1116 etc.

Various software modules of the present invention may support graphical user interfaces (GUIs) through which an individual 100 can interact with the system 10. A GUI may offer, for example, graphical elements, visual indicators, and/or text to represent information and actions available to the individual 100. The individual 100 may use a physical input device, such as keyboard or scroll ball to interact with the GUI of the electronic device 400. Alternatively, the individual 100 may use a touch screen to interact directly with what is displayed. Various touch screens such as, for example, resistive or capacitive touch screens, may be employed. Those skilled in the art will appreciate that alternative or additional software modules and sub-modules may be implemented in order to provide or extend the described or additional functionalities to the individual 100 using the electronic device 400. For example, the software configuration of software stored on an electronic device 400 may include a device operating system, which may be one of the commercially available mobile phone operating systems such as, for example, BlackBerry OS, iPhone OS, Windows Mobile, Symbian, LINUX, WebOS, or Android. The device operating system may also have an associated application programming interface through which middleware and application programs may access the services of the operating system.

The various modules of the system 10 of the present invention may support GUIs through which an individual 100 can interact with the system 10 using the electronic device 400 just prior to and/or during an activity. As will be appreciated by those of skill in the art, in one embodiment the GUIs may be supported by a mobile device application being run on the electronic device 400. In another embodiment, the GUIs may appear as web pages provided by the server via a website that may be accessible to the individual 100 over the network using a web browser on their electronic device 400. The GUIs may be considered to be part of the methods or systems of the present invention.

In order to access the features of embodiments of the present invention just prior to or during a physical activity, the individual 100 using the electronic device 400 may power on their electronic device 400 if it is not already in a powered up state. In some embodiments, it may be necessary for the individual 100 to manipulate user input controls to enter system 10 mode to access the application software. In some embodiments, calculations may be run in the background, e.g., on electronic device 400. In this regard, the data generated may be synced with the application software or other modules while they are not active, e.g., while they are running in the background. Historical data are queried in response to the individual 100 manipulating user input controls to access the application software. Once the data are synced, historical calculations may be run, and various GUI and information may be updated retroactively.

In some embodiments, the software app running on the electronic device 400 may also include "hidden" features that cannot be accessed unless unlocked in standard operation of the app without an additional step, such as automatic cycling activity detection. In one embodiment, the additional step may include the selection or purchase of a particular health or fitness goal or workout plan, attaining particular personal performance metrics, or activating the app during a specified time period (e.g. on a holiday or particular day of the week) or when the electronic device 400 is being used in a specified geographical location (e.g. in a specific city, park, etc.). In some embodiments, features may be controlled through a "Guest Mode," where information may be saved but a guest individual can only view a limited time history, e.g., one week. In some embodiments, once they create an account, an entire history may become available. In some embodiments, the Guest Mode may restrict the number of discovery experiences that may be active.

After launching the application software, the individual 100 may cause different GUI pages to be provided by different modules by selecting their corresponding icons using user input controls. Additional icons corresponding to sub-modules or program wizards associated with a particular module may pop up or otherwise be displayed to the individual 100 if the individual 100 selects, swipes, or hovers over a module icon with a cursor. All modules may have one or more sub-modules which may be navigated to and from by clicking, swiping, etc. All modules may have one or more sub-modules which may be navigated to and from by clicking, swiping, etc. In some embodiments, the system may allow the individual 100 one of upload photos, videos, medical records, and the like for incorporation into the system.

In some embodiments, there may be an introduction animation for first time use of the system 10. There may also be a setup and tutorial for first time use by the individual 100. Additionally there may be a walkthrough section that may include step-by-step instructions explaining the process of the system and corresponding application. In some embodiments, the system 10 may automatically select the language and localization of the electronic device 400 characteristics, IP address, GPS location, or the like. The system 10 may also allow for default language preferences to be changed in a settings menu.

As discussed above, system 10 may track activity details. In some embodiments, active minutes may be tracked by system 10. Active minutes may include a measure of the time individual 100 is active in any way. In some embodiments, walking, running, and cycling are all considered active, regardless of the intensity, for example. In some embodiments, workouts may be added, and considered active, regardless of the intensity. In some embodiments, this may encourage individual simply to be active, no matter what the method, and may contribute positively to behavior change. In some embodiments, active calories may be determined by system 10. For example, activities like an aerobics class, that are harder and more intense burn more calories per minute than activities like walking that are less intense. Active calories may account for intensity, convolved with active minutes, to further inform individual 100. In some embodiments, system 10 may track trends, e.g., such as a active week followed by a low week. In some embodiments, based on the type of activity, a subset of active minutes may be assigned Metabolic Equivalent of Task (MET). In some embodiments, METS are then multiplied by individual's data, such as weight and time of activity to calculate active calories. In some embodiments, system 10 may add in calories as measured from external workouts, third party applications, etc. In some embodiments, calories may include more detailed intensity data like speed, power, or heart rate.

In some embodiments, the systems and methods related to the automatic detection of cycling activity and cycling workouts contemplate physical alteration of code or components, such as transforming code or components such that the system or method is physically altered (e.g., creating a new data file, for example). Advantageously, the solutions provided herein are rooted in technology, e.g., computer technology, and overcome problems related to physiological monitoring for example and GPS speed analysis among similar speed ranges for different activities such as cycling and automotive transit, or cycling and fast running, for example. These solutions are unique to technological realms such as data processing, e.g., GPS data stream processing and display. The systems and methods described herein additionally may contemplate additional elements beyond data relationships, such that the solutions tie process advantages to a particular device and increase performance of such a device (e.g., increasing processing efficiency, resolution for location based features, etc.).

In some embodiments, individual 100 can interact with a displayed activity, and the specific activity will be shown on a respective detail module or sub-module. In some embodiments, individual may view all workouts detected for the specific activity. In some embodiments, system 10 will include additional information, such as total duration, session duration, intensity level, activity start or end time, distance, calories, total calories, step count, etc. In some embodiments, workout durations include a majority of the activity, but may also include time for breaks, or other activities. In some embodiments, "Ambient" Walking or Running minutes are shown within the Walking and Running detail screens. "Ambient" minutes include walking or running minutes that have not been included within a workout, e.g., the walking and running that individual 100 does in small amounts throughout a day.

As used herein, the threshold points, ranges, parameter names, etc., may be given variable names that indicate what they are intended to describe within a module or sub-module that may incorporate higher-order programming or scripting functions.

In some embodiments, software platform may include a speed parameter module 1102. In some embodiments, speed parameter module 1102 may define ranges or thresholds for activities (e.g., cycling-specific speed classifications). In some embodiments a particular activity, e.g., cycling, may be characterized with several threshold points. For example, speed parameter module 1102 may define the top and bottom of the range that is to be considered as "cycling speed". The below ranges are representative ranges for traditional commuting by bike. In some embodiments, speed parameter module 1102 may automatically update the below ranges, e.g., in response to user input, feedback, or sensed data. For example, the ranges may be dynamically adjusted for environmental factors on a repeated route (e.g., terrain such as rolling hills or long climbs, or weather, such as sustained headwinds). In some embodiments, the speed parameter module 1102 may suggest updates to these ranges, which may be confirmed by the individual, such that the speed parameter module 1102 is further customized and enhanced. For example, as illustrated below:

CycleSpeedRangeHigh=about 25 mph (indicates that the highest cycle speed range is about 25 miles per hour)

CycleSpeedRangeLow=about 9 mph (indicates that the lowest range within a cycling speed range is about 9 miles per hour)

Additionally, speed parameter module 1102 may define a threshold point such that it may identify another speed to help distinguish cycling from automotive activity. For example, speed parameter module 1102 may define a threshold point:

CycleSpeedRangeWayHigh=about 30 mph (indicates that a potentially very high cycling speed range may exist at least around about 30 miles per hour)

In some embodiments, speed parameter module 1102 may define or characterize separate ranges, e.g., based on the threshold points described herein. For example, speed parameter module 1102 may define a plurality of cycling specific ranges, e.g., speed segments, as shown below:

WayFasterThanCyclingSpeed: speed >=CycleSpeedRange WayHigh

This indicates that the speed is generally too high to be considered cycling.

FasterThanCyclingSpeed: CycleSpeedRangeHigh <=speed <CycleSpeedRange WayHigh

This indicates that the speed may indicate cycling, depending on duration and other environmental context for example (e.g., descending a hill).

CyclingSpeed: CycleSpeedRangeLow <=speed <CycleSpeedRangeHigh

This indicates that this speed is within an expected speed range for cycling. Note that in some embodiments, the system may discern this speed to include fast running, rather than cycling, depending on duration and other environmental context for example (e.g., ascending a hill).

SlowerThanCyclingSpeed: 0<=speed <CycleSpeedRangeLow

This indicates that this speed is lower an expected speed range for cycling. Note that in some embodiments, the system may discern this speed to include cycling nonetheless, depending on duration and other environmental context for example (e.g., ascending a hill).

In this regard, system 10 may apply further modules to categorize speeds received and process this information into useful information about whether cycling activity or cycling workouts have been automatically detected, as further explained herein. In some embodiments, additional speed ranges may be defined, e.g., commuting speed ranges, user specific speed ranges, terrain specific speed ranges (e.g., higher speed ranges at a particular place along a route, such as ascending or descending a hill, or navigating challenging turns, etc.).

In some embodiments, software platform 1000 may include a GPS parameter module 1100. In some embodiments, GPS parameter module may be configured to adjust a third party software platform or an operating system software platform, e.g., to adjust an electronic device's GPS parameters. For example, software platform may enable "continuous mode" to continuously send a GPS data stream to software platform 1000. In some embodiments, GPS parameter module 1100 may configure a GPS parameter to enable a GPS data stream to be delivered to software platform 1000 even if the platform is running in the background of the operating system, or not actively running, for example.

In some embodiments, GPS parameter module 1100 may be configured to adjust one or more of a distance filter and a desired accuracy of a GPS data stream. In general, setting these parameters to improve the frequency and accuracy of the GPS data stream increases the rate of battery drain. Setting these parameters to decrease the frequency and accuracy of the GPS data feed generally reduces the rate of battery drain. In some embodiments, GPS parameter module 1100 may advantageously balance these parameters, such that more than one set of parameters may be applied based on particular inputs. In some embodiments, GPS parameter module 1100 may set a "background" set of parameters for distance filter and desired accuracy of a GPS stream to be used when the software platform 1000 is running throughout the day while monitoring for the start of possible cycling activity. The background set of parameters will advantageously increase battery life. In some embodiments, GPS parameter module 1100 may set a "tracking" set of parameters for distance filter and desired accuracy of a GPS stream to be used when the software platform 1000 has determined that an individual may be engaging in cycling, which may increase fidelity of the data stream, and thus may be more battery intensive. For example, two sets of parameters are shown below:

BackgroundDistanceFilter=about 250 meters
BackgroundDesiredAccuracy=about 50 meters
TrackingDistanceFilter=about 50 meters
TrackingDesiredAccuracy=about 10 meters In some embodiments, software platform may determine that a speed arrives in the GPS data stream that is classified within the CyclingSpeed range, the GPS parameter module 1100 may automatically switch the GPS parameters to the tracking parameters. In some embodiments, GPS parameter module 1100 may automatically revert to "background" parameters upon a particular event that indicates an individual may not be cycling (e.g., speed near zero for a sufficient amount of time, speed far too fast to indicate cycling, etc.).

In some embodiments, software platform 1000 may include a data stream communication module 1104. In some embodiments, data stream communication module 1104 may be configured to receive a continuous data stream of GPS speeds, e.g., throughout the day. In some embodiments, the data stream of GPS speeds may include a timestamp, and a speed at discrete time intervals, e.g., once per second. For example, a data stream of GPS speeds may include information such as at time-stamp, and a speed, e.g., in miles per hour. In some embodiments, other units of measure may be used, for example, configured by an individual 100 according to their preference. As shown below, a data stream of GPS speeds may include, for example:

At Time1, Speed1 mph
At Time2, Speed2 mph
At Time3, Speed3 mph

In some embodiments, software platform 1000 may include a speed segment module 1106. In some embodiments, software platform 1000 may include a speed segment module 1106, such that speed segment module 1106 converts a data stream of GPS speeds:

At Time1, Speed1 mph
At Time2, Speed2 mph
At Time3, Speed3 mph into a data stream of speed segments. For example, the above data stream of GPS speeds would be converted to indicate the following information into a data stream of speed segments:

At Time1, Speed1 mph for (Time2-Time1) duration
At Time2, Speed2 mph for (Time3-Time2) duration
At Time3, Speed3 mph for (Time4-Time3) duration In some embodiments, software platform 1000 may include a density bucket module 1108. Once a data stream of speed segments is created, density bucket module 1108 may process the data stream of speed segments into "minute buckets", such that the data stream may be "bucketed" (e.g., categorized/organized) into "buckets" of one minute. That is, density bucket module 1108 operates to organize the speed segment data stream such that each minute bucket represents the "density" of each of the speed classifications within that 1-minute span, and is time-stamped to coincide with a minute of a particular day. As an example, a minute bucket for MM/DD/YYYY hh:mm may include the following information:

WayFasterThanCyclingSpeed: 0 secs=0% density
FasterThanCyclingSpeed: 30 secs=50% density
CyclingSpeed: 6 secs=10% density
SlowerThanCyclingSpeed: 24 secs=40% density In order to achieve this data breakdown, in some embodiments, software platform may organize minute buckets into an array. In some embodiments, an initial minute bucket may be initialized to all 0% density for each of the speed categorizations. As the speed segment data stream is received, density bucket module 1108 may begin to process the data. In some embodiments, density bucket module 1108 begins a new minute bucket at a particular timestamp, such that the speed segment data stream is coextensive with the minute bucket timestamp calculation.

In some embodiments, software platform 1000 may include a data array module 1110. In some embodiments, as minute buckets are categorized by density bucket module 1108, data array module 1110 may accumulate and store the minute bucket data into an analysis array. As the data accumulates into the array, data array module 1110 may further perform operations on the array to determine whether the individual may be cycling or not. In some embodiments, if the individual is cycling, data array module 1110 will add the active minutes to the ongoing daily active minutes tally, and will auto-detect any cycling workouts embedded in the same data.

In order to further describe the modules and algorithms applied, the following terms and acronyms are set described.

Candidate Start Density Threshold ("CSDT"), may be defined as the density of the cycling speed classification for a minute bucket that must be met in order for that minute to be considered a candidate for the start of cycling, for example, 60%.

Minimum Time Inactive ("MTI") may be defined as the minimum inactive time required after cycling speed activity before the algorithm considers possible cycling activity to have ended, for example, 6 minutes. In some embodiments, MTI must be evenly divisible by 3. In some embodiments, MTI may be configured by individual 100.

Inactive Average Density Threshold ("IADT") may be defined as the average activity density across a sequence of minute buckets that must not be exceeded in order for the algorithm to consider that sequence to be inactive, for example, 10%.

Maintenance Average Density Threshold ("MADT") may be defined as the average cycling speed density across a sequence of minute buckets that must be met in order for the algorithm to consider that sequence to be maintaining the activity of cycling, for example, 50%.

Minimum Time Active ("MTA") may be defined as the minimum time active required before we consider a segment of data a workout, or session. For example, MTA may be set such that the algorithm does not count activity identified as cycling as a workout or session unless it lasts for 10 minutes or longer. In some embodiments, MTA may be configured by the individual 100. In some embodiments, a lower threshold MTA may be set such that it is not configurable by individual 100, e.g., at least 10 minutes. In some embodiments, if cycling speeds are detected that do not meet a lower threshold MTA, their minute buckets may be re-classified as ambient active minutes, and not reported in automatically detected cycling minutes.

In some embodiments, software platform 1000 may include an array analysis module 1112. In this regard, data array module 1110 may be used to feed data into data analysis module, such that a sequential flow of chronologically ordered speed density minute buckets, each bucket arriving as an "event".

In some embodiments, as the minute buckets are received by the data array module 1110, in order to initialize the storage of the minute bucket, data array module 1110 may determine if the minute bucket array is currently empty, and if so, determine if the array includes speed classifications that are not likely cycling, e.g., if the event includes very high speeds, or if the cycling speed density does not meet the Candidate Start Density Threshold. If one or more of these tests indicate that there is no cycling, data array module 1110 may be configured to not store that particular minute bucket, and await the next minute bucket to be received by the data array module 1110. These calculations may be performed in array analysis module 1112, for example. In some embodiments, if the array includes information that may be relevant to cycling, e.g., the Candidate Start Density Threshold is met by the current minute bucket, or has been meet by a previous minute bucket, the subject minute bucket may be stored either as the first entry in the array, or append the minute bucket to the end of the array.

In some embodiments, array analysis module 1112 may check whether there is an inactive section at the end of the minute bucket, e.g., whether at the end of the timestamp of the minute bucket there is data relevant to the Minimum Time Inactive calculation, below the Inactive Average Density Threshold. In some embodiments, this check may aid in determining when to close the data array, e.g., when MTI indicates that a cycling activity has likely ended. In some embodiments, array analysis module 1112 may analyze the data array, such that the algorithm reviews the data array from zero to the length of the minute bucket array, or optionally one less than the length of the minute bucket array. In some embodiments, this check may result in a true or false result. Array analysis module 1112 may assign a marker to a minute bucket indicating that while there was no cycling detected in a particular minute bucket, the minute bucket is adjacent to a minute bucket including cycling activity, and the MTI has not yet been reached.

In some embodiments, array analysis module 1112 may determine there is cycling within a particular minute bucket. Once array analysis module 1112 has determined there is cycling activity within a minute bucket, array analysis module 1112 may then further analyze the array to determine whether there is a cycling workout that should be automatically detected. If no cycling workout exists within the array, then the array analysis module 1112 may be configured to take no further action, and simply report cycling active minutes. If a cycling workout exists within the array, the array analysis module 1112 may be configured to report the cycling workout or cycling session, and add those cycling minutes to the total cycling active minutes, and total active minutes.

In some embodiments, software platform 1000 may include reset module 1116. In some embodiments, once an array is fully processed, reset module 1116 may reset the algorithm. For example, reset module 1116 may delete data within an analysis array, or may begin the process again of storing the data within an array, or analyzing an array. In some embodiments, reset module 1116 may check each minute bucket entry in the array, and if an array includes speed segments that are much higher than cycling, reset module 1116 may mark the minute bucket to identify that there is likely automotive or transit activity within that particular minute bucket (e.g., prior to any new entries added to the array).

In some embodiments, reset module 1116 may mark or reset any minute bucket having speed segments that are much higher than cycling as not cycling minutes. In some embodiments, a separate test may be performed, such that only if a speed segment is much higher than cycling speed for a particular duration threshold, e.g., 2 seconds, for example to account for spurious spikes in speed. In some embodiments, the test may return a true or false indication. In some embodiments, reset module 1116 may reset the array if GPS parameter module 1100 sets the GPS parameters to the background parameters.

Turning back to array analysis module 1112, in some embodiments, array analysis module 1112 may calculate the total cycling speed duration in seconds, over a range of minute bucket entries in an array. In some embodiments, array analysis module 1112 may then convert this information into active cycling minutes.

In some embodiments, array analysis module 1112 may determine whether an end section of an array includes minute buckets having an average speed density below the Inactive Average Density Threshold, and mark or count this minute bucket towards the Minimum Time Inactive threshold. In some embodiments, array can mean that there are both slower and faster speeds during those minute buckets. In some embodiments, analysis module may analyze the current length of a minute bucket array, and if the current length is greater than the Minimum Time Inactive threshold, then analysis module may begin to review whether after the start of the potential inactive section continues, such that the MTI is reached. If during this time, the average cycling speed density is greater than IADT, then the array analysis module 1112 determines that MTI has not been reached, and the calculation may be restarted if an inactive section arrives at the end of a minute bucket within the array.

In some embodiments, analysis module 1112 may analyze the array to determine if there are sections within the array (e.g., consecutive minute buckets) that include cycling speed density greater than Candidate Start Density Threshold within a given section of the array, and if the average cycling speed density is greater than Maintenance Average Density Threshold, then there is a cycling speed activity through that range of the array.

In some embodiments, software platform 100 may include a configuration or confirmation module 1114. In some embodiments, once a section of an array is identified that may include cycling activity, confirmation module 1114 may apply additional tests on the data. For example, If there are other patterns within the section of the array that indicate automotive travel, for example, confirmation module 1114 may determine that a portion of the array analyzed is not cycling activity. For example, if the array indicates that there are automobile or transit speeds longer than about 15 seconds, this may indicate automotive or transit travel (rather than a fast descent on a bicycle or data anomaly). In some embodiments, confirmation module 1114 may compare the data array section to another data set from a separate data stream, e.g., a running speed data stream. In this regard, confirmation module 1114 may determine whether a portion of the array indicating cycling activity is actually fast running activity. In general, GPS data may be used to detect patterns that may classify cycling activity. Additional parameters may be utilized, beyond speed specific data such as latitude, longitude, timestamp difference between discrete points, etc. Other patterns may also be utilized, e.g. speed variation patterns such as spikes in speed, acceleration, etc. Traffic information may be fed into the application program, such that additional refinement may be possible to determine whether activity is cycling activity. GPS elevation data may be used, e.g., to determine whether the individual is ascending or descending a particular path, in order to further estimate whether the individual is engaged in cycling. Acceleration patterns may be utilized, e.g., in order to confirm whether an individual is engaged in cycling (due to typically higher rates of acceleration of automobile travel and lower rate of running).

In some embodiments, array analysis module 1112 may determine if an array contains a cycling workout. In some embodiments, array analysis module 1112 limits this calculation to a portion of an array already determined to include cycling speed activity. analysis module 1112 may analyze the array to determine if there are sections within the array (e.g., consecutive minute buckets) that include cycling speed density greater than Candidate Start Density Threshold within a given section of the array, and if the average cycling speed density is greater than Maintenance Average Density Threshold, then there is a cycling speed activity through that range of the array, and if the minute buckets add up to at least the Minimum Time Active, then there is a cycling workout in a portion of the array. In some embodiments, system 10 may "round up" and increment the total workout minutes by one minute, e.g., to account for a likelihood that there may be some activity that fell into the bucket just prior to the first determined workout bucket that satisfies the starting minute threshold. In some embodiments, system 10 may "round up" and increment the total workout minutes by one minute, e.g., to account for a likelihood that there may be some activity that fell into the bucket just after to the determined ending workout bucket that satisfies the threshold. In some embodiments, the algorithm applied applies these inferences, by reducing the user set Minimum Time Active by one minute or two minutes within the algorithm code.

As described above, in some embodiments, software platform 1000 may communicate with a third party software platform 2000, or an operating system software platform 3000, and exchange and or utilize data streams or settings from one or more additional software platforms. In some embodiments, third party software platform 2000 or software platform 3000 may be utilized by system 10 (and software platform 3000) to effect one or more of the above described modules. For example, in some embodiments, operating system software platform 3000 may provide a notification to software platform 1000, for example when individual 100 has traveled a significant distance after some time (e.g., about 500 meters, over about 5 minutes.). In some embodiments, software platform 1000 may default to the background parameters set within GPS parameter module. If operating system software platform 3000 or third party software platform 2000 indicates that an individual 100 has traveled a significant distance after some time, the GPS parameter module 1100 may automatically switch the GPS parameters to the tracking parameters. In some embodiments, GPS parameter module 1100 may automatically revert to "background" parameters upon a particular event that indicates an individual may not be cycling (e.g., speed near zero for a sufficient amount of time, speed far too fast to indicate cycling, etc.).

In some embodiments, system 10 may include an add activity/add workout module 1118. Add workout module 1118 may include, for example, recent activities added, or popular workouts for an individual to select. As shown, certain activities may include icons representative of the activity, e.g., a simplified mountain icon for a hiking activity, a flower icon for yoga activity, a simplified bicycle for cycling, etc. As shown, add workout module 1118 may be used to select a type of workout, name of workout, date of activity, time of activity, duration of activity, intensity of activity, location of activity, etc. In some embodiments, individual 100 may be able to search for particular workouts, e.g., through a network, or internet, for example. In some embodiments, intensity of activity may specify a general intensity for the whole workout, such as "Low", "Medium", "High". In some embodiments, these intensities will be used to help system 10 daily calories, or daily active calories. In some embodiments, the intensities may be used to track difficult and easy days. In some embodiments, the activities may be editable, such as through swiping or tapping on the representative GUI, and may edit the content described. In some embodiments, an individual 100 may not be able to edit activities that are auto-tracked via system 10. In some embodiments, analysis module may compare data from the add activity/add workout module, such that automatically detected activity, e.g., cycling activity, cycling sessions, or cycling workouts are not counted twice, for example with the automatic detection as well as a manually added activity.

Various software modules of the present invention may support graphical user interfaces (GUIs) through which an individual 100 can interact with the system 10. A GUI may offer, for example, graphical elements, visual indicators, and/or text to represent information and actions available to the individual 100. The individual 100 may use a physical input device, such as keyboard or scroll ball to interact with the GUI of the electronic device 400. Alternatively, the individual 100 may use a touch screen to interact directly with what is displayed. Various touch screens such as, for example, resistive or capacitive touch screens, may be employed. Those skilled in the art will appreciate that alternative or additional software modules and sub-modules may be implemented in order to provide or extend the described or additional functionalities to the individual 100 using the electronic device 400. For example, the software configuration of software stored on an electronic device 400 may include a device operating system, which may be one of the commercially available mobile phone operating systems such as, for example, BlackBerry OS, iPhone OS, Windows Mobile, Symbian, LINUX, WebOS, or Android. The device operating system may also have an associated application programming interface through which middleware and application programs may access the services of the operating system.

The various modules of the system 10 of the present invention may support GUIs through which an individual 100 can interact with the system 10 using the electronic device 400 just prior to and/or during an activity. As will be appreciated by those of skill in the art, in one embodiment the GUIs may be supported by a mobile device application being run on the electronic device 400. In another embodiment, the GUIs may appear as web pages provided by the server via a website that may be accessible to the individual 100 over the network using a web browser on their electronic device 400. The GUIs may be considered to be part of the methods or systems of the present invention.

In order to access the features of embodiments of the present invention just prior to or during a physical activity, the individual 100 using the electronic device 400 may power on their electronic device 400 if it is not already in a powered up state. In some embodiments, it may be necessary for the individual 100 to manipulate user input controls to enter system 10 mode to access the application software.

After launching the application software, the individual 100 may cause different GUI pages to be provided by different modules by selecting their corresponding icons using user input controls. Additional icons corresponding to sub-modules or program wizards associated with a particular module may pop up or otherwise be displayed to the individual 100 if the individual 100 selects, swipes, or hovers over a module icon with a cursor. All modules may have one or more sub-modules which may be navigated to and from by clicking, swiping, etc. All modules may have one or more sub-modules which may be navigated to and from by clicking, swiping, etc. In some embodiments, the system may allow the individual 100 one of upload photos, videos, medical records, and the like for incorporation into the system.

In some embodiments, individual 100 may opt-in to enable tracking of active minutes, which may be achieved directly through electronic device 400, sensor module 102, or the like. In some embodiments, there may be an additional module or sub-module to allow access to additional data, for example, data sources particular to a mobile device operating system, or third party data sources. As shown, these sources may enable data sources such as sleep data, step data, walking/running distance, weight data, and other data for analysis by system 10. In some embodiments, this may include access to data measured by electronic device 400 (e.g., a mobile phone carried by individual 100). In some embodiments, data may include number of steps, distance walked, active calories (e.g., based on active minutes and workout intensities), location data, weight, nutrition data, hydration data, sleep data (e.g., "asleep data," "in bed" data, etc.), 3rd party data from additional devices or applications, etc. In some embodiments, individual 100 may sync software platform 1000 with third party data or devices during on-boarding (e.g., first time startup), or at a later time within the settings of software platform 1000, for example, or the electronic device's 400 settings.

Modules may display a type of athletic activity icon set that may be used to convey various pieces of information to the individual 100, and from which the individual 100 can select types of activity they will participate in or have participated in. In some embodiments, there may be selection icons for the types of surfaces that the activity will take place on (e.g. road/sidewalk, treadmill, trail, and everywhere). In either case, individuals may be able to select multiple icons to denote intended environment and use. In some embodiments, modules may provide for goal definition, for example athletic goals such as training for a race, or other sporting event, improving individual fitness, simply enjoy running, or the like.

Modules may apply data from the user to enhance the algorithms, systems, and methods discussed herein. Machine learning techniques may be utilized, or other learning based off user's input or confirmation of data may be utilized and further improve future calculations.

Frequency intervals may include for example about 1-2 times per week, about 3-4 times per week, about 5-7 times per week, or the individual doesn't know. Length intervals may include for example about less than about 5 miles per week, about 5-10 miles per week, about 10-20 miles per week, greater than about 20 miles per week, or the individual doesn't know. Examples of intended athletic terrain environments may include roads, track, treadmill, trail, gym, or particular athletic fields designed for a specific sport. In some embodiments, system 10 may allow the individual 100 to select a location of any prior injuries within a certain period of time. The system 10 may include selection icons corresponding to particular body parts. In some embodiments, the system may display a graphical representation of an individual or avatar, and allow the individual 100 to directly select the particular area with a previous injury on the graphical representation. In some embodiments, the system may allow the individual 100 to one of upload photos, videos, medical records, and the like for incorporation into the system and methods.

Embodiments of the present invention may incorporate features of motion and performance monitoring systems. Exemplary motion monitoring and performance systems are disclosed in commonly owned U.S. patent application Ser. No. 13/077,494, filed Mar. 31, 2011 (which published as U.S. Patent App. Pub. No. 2012/0254934), and commonly owned U.S. patent application Ser. No. 13/797,361, filed Mar. 12, 2013 (which published as U.S. Patent App. Pub. No. 2014/0266160), the entirety of each being incorporated herein by reference thereto.

An overview of exemplary embodiments of components of the system 10 of the present invention, including exemplary sensor modules 102, has been provided above.

Figure 3:
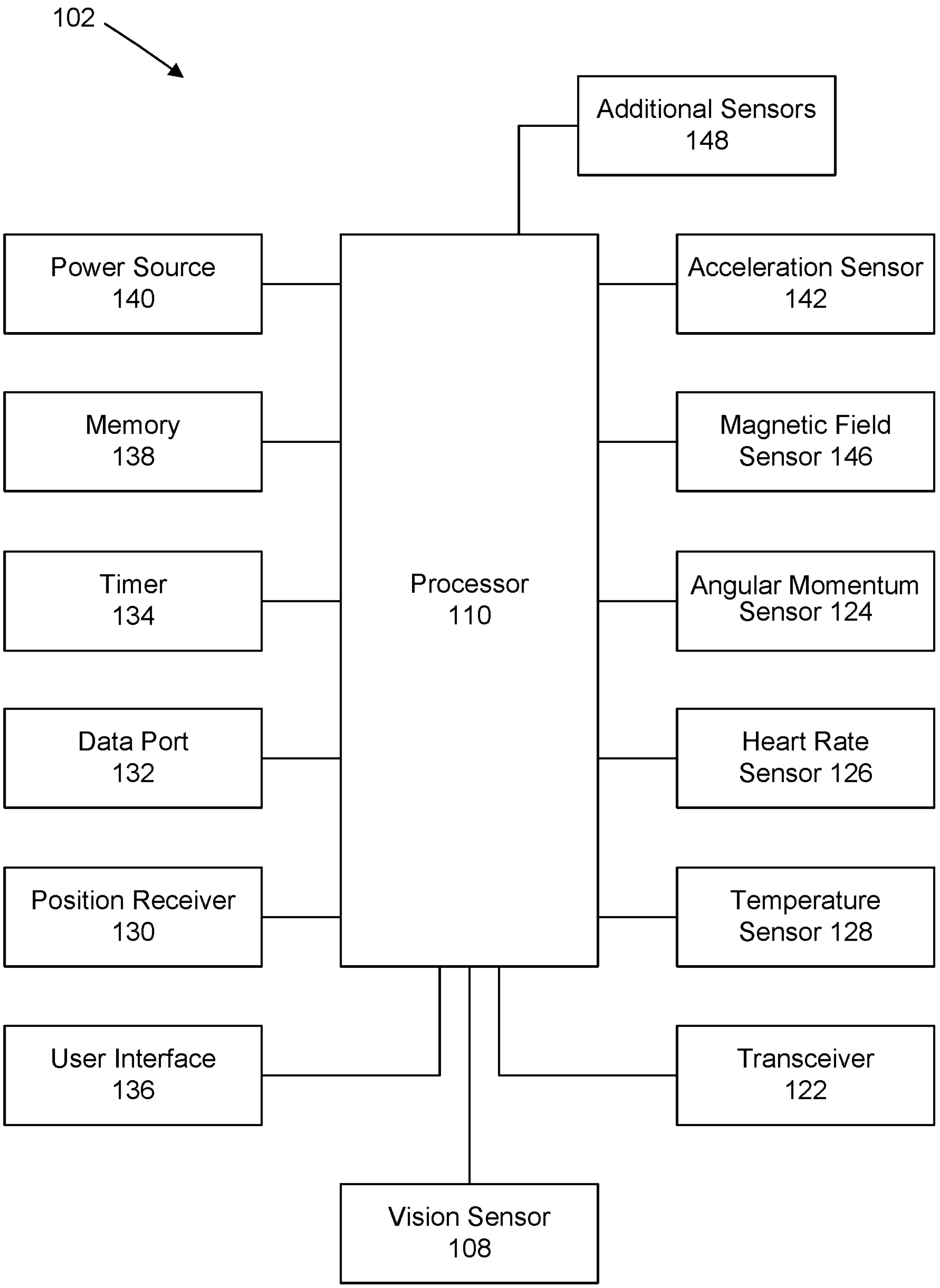
FIG. 3 is an example sensor module useful for implementing various embodiments.

Turning to FIG. 3, a block diagram of components of a sensor module 102 according to some embodiments of the present invention is shown. In the illustrated embodiment, the sensor module 102 may include processor 110 (processor 110 may also be a separate component). Sensor module 102 may include a power source 140, a memory 138, an acceleration sensor 142, a magnetic field sensor 146, and a transceiver 112 (transceiver 112 may be a separate component). These components are operatively connected to one another to carry out the functionality of the sensor module 102. In other embodiments, one or more of these sensor module 102 components may be omitted, or one or more additional components may be added. Processor 110 may be included in sensor module 102, or may be a separate component. Processor 110 may be adapted to implement application programs stored in the memory 138 of the sensor module 102. The processor 110 may also be capable of implementing analog or digital signal processing algorithms such as raw data reduction and filtering. For example, processor 110 may be configured to receive raw data from sensors and process such data at the sensor module 102. The processor 110 is operatively connected to the power source 140, the memory 138, the acceleration sensor 142, the magnetic field sensor 146, and the transceiver 112.

In an embodiment, calibration of sensor module 102 is performed using, for example, received GPS signals from a position receiver 130. The received GPS signals can be used, for example, to determine a distance that an individual runs or walks during a workout.

The power source 140 may be adapted to provide power to the sensor module 102. In one embodiment, the power source 140 may be a battery. The power source may be built into the sensor module 102 or removable from the sensor module 102, and may be rechargeable or non-rechargeable. In some embodiments, the power source 140 may be recharged by a cable attached to a charging source, such as a universal serial bus ("USB") FireWire, Ethernet, Thunderbolt, or headphone cable, attached to a personal computer. In another embodiment, the power source 140 may be recharged by inductive charging, wherein an electromagnetic field is used to transfer energy from an inductive charger to the power source 140 when the two are brought in close proximity, but need not be plugged into one another via a cable. In some embodiment, a docking station may be used to facilitate charging. In other embodiments, the sensor module 102 may be repowered by replacing one power source 140 with another power source 140.

The memory 138 may be adapted to store application program instructions and to store athletic activity data. In some embodiments, the memory 138 may store application programs used to implement aspects of the functionality of the system 10 described herein. In one embodiment, the memory 138 may store raw data, recorded data, and/or calculated data. In some embodiments, as explained in further detail below, the memory 138 may act as a data storage buffer. The memory 138 may include both read only memory and random access memory, and may further include memory cards or other removable storage devices.

In some embodiments of the present invention, the memory 138 may store raw data, recorded data, and/or calculated data permanently, while in other embodiments the memory 138 may only store all or some data temporarily, such as in a buffer. In one embodiment of the present invention, the memory 138, and/or a buffer related thereto, may store data in memory locations of predetermined size such that only a certain quantity of data may be saved for a particular application of the present invention.

The acceleration sensor 116 may be adapted to measure the acceleration of the sensor module 102. Accordingly, when the sensor module 102 is physically coupled to an object such as electronic device 400, for example, or individual 100, the acceleration sensor 116 may be capable of measuring the acceleration of the object, including the acceleration due to the earth's gravitational field. In one embodiment, the acceleration sensor 116 may include a tri-axial accelerometer that is capable of measuring acceleration in three orthogonal directions. In other embodiments one, two, three, or more separate accelerometers may be used.

The magnetic field sensor 146 may be adapted to measure the strength and direction of magnetic fields in the vicinity of the sensor module 102. Accordingly, sensor module 102, utilizing the magnetic field sensor 146, may be capable of measuring the strength and direction of magnetic fields in the vicinity of the individual 100, including the earth's magnetic field. In one embodiment, the magnetic field sensor 146 may be a vector magnetometer. In other embodiments, the magnetic field sensor 146 may be a tri-axial magnetometer that is capable of measuring the magnitude and direction of a resultant magnetic vector for the total local magnetic field in three dimensions. In other embodiments one, two, three, or more separate magnetometers may be used.

In one embodiment of the present invention, the acceleration sensor 116 and the magnetic field sensor 146 may be contained within a single accelerometer-magnetometer module bearing model number LSM303DLHC made by STMicroelectronics of Geneva, Switzerland. In other embodiments, the sensor module 102 may include only one of the acceleration sensor 116 and the magnetic field sensor 146, and may omit the other if desired.

The transceiver 122 depicted in FIG. 3 may enable the sensor module 102 to wirelessly communicate with other components of the system 10, such as those described in further detail below. In one embodiment, the sensor module 102 and the other local components of the system 10 may communicate over a personal area network or local area network using, for example, one or more of the following protocols: ANT, ANT+ by Dynastream Innovations, Bluetooth, Bluetooth Low Energy Technology, BlueRobin, or suitable wireless personal or local area network protocols. Other known communication protocols suitable for a system 10 may also be used. In one embodiment, the transceiver 122 is a low-power transceiver. In some embodiments, the transceiver 122 may be a two-way communication transceiver 122, while in other embodiments the transceiver 122 may be a one-way transmitter or a one-way receiver. Wireless communication between the sensor module 102 and other components of the system 10 is described in further detail below. In other embodiments, the sensor module 102 may be in wired communication with other components of the system 10 that does not rely on transceiver 122.

In some embodiments of the present invention, a sensor module 102 having components such as those depicted in FIG. 3 may be physically coupled to individual 100. Sensor module 102 may further monitor changes in the spatial orientation of the individual's 100 body or a piece of the individual's athletic equipment or article of footwear, or to determine a correlation between body or equipment movement data and a characteristic such as gait characteristic. In some embodiments, additional sensors not coupled to individual 100 (e.g., other acceleration sensors, physiological sensors, etc.) may be responsible for collecting the data necessary to carry out the various monitoring calculations.

In some other embodiments, however, it may be desirable to have additional sensors 148 (for example, such as speed sensors, etc.) included within the sensor module 102, or operatively connected to sensor module 102, or to have additional sensors in communication with the sensor module 102. In some embodiments, an additional sensor module 102 may be integrated within an existing piece of athletic activity monitoring equipment possibly having additional or different sensors such as, for example, a heart rate monitoring device, a pedometer, and accelerometer-based monitoring device, or other fitness monitoring device.

In one embodiment, sensor modules 102 according to the present invention are used to detect changes in an individual's direction of motion. Sensor modules 102 according to the present invention can also be worn by individuals and used to detect and/or track other motions such as, for example, motions associated with push-ups, pull-ups, weightlifting, diving, gymnastics, et cetera.

In addition to the acceleration sensor 116 and the magnetic field sensor 118, other sensors that may be part of the sensor module 102 or separate from but in communication with the sensor module 102 and may include sensors capable of measuring a variety of athletic performance parameters. The term "performance parameters" may include physical parameters and/or physiological parameters associated with the individual's 100 athletic activity. Physical parameters measured may include, but are not limited to, time, distance, speed, pace, pedal count, wheel rotation count, rotation generally, stride count, stride length, airtime, stride rate, altitude, strain, impact force, jump force, force generally, and jump height. Physiological parameters measured may include, but are not limited to, heart rate, respiration rate, blood oxygen level, blood lactate level, blood flow, hydration level, calories burned, or body temperature.

While various embodiments of the present invention are described in the context of the general health and wellness in terms of activity, nutrition, mindset, and rest, the present invention is not so limited and may be applied in a variety of different sports or athletic activities including, for example, running, sports of soccer (i.e., football), basketball baseball, bowling, boxing, cricket, cycling, football (i.e., American football), golf, hockey, lacrosse, rowing, rugby, running, skateboarding, skiing, surfing, swimming, table tennis, tennis, or volleyball, or during training sessions related thereto. In some embodiments, the system may make recommendations regarding articles of apparel or other sports equipment in addition to, or in substitution of articles of footwear.

As shown in FIG. 3, in some embodiments, sensor module 102 may incorporate other additional components. In some embodiments, sensor module 102 may incorporate an angular momentum sensor 124, a heart rate sensor 126, a temperature sensor 128, a position receiver 130, a data port 132, a timer 134, and a vision sensor 108 operatively connected to one another to carry out the functionality of the sensor module 102. In other embodiments, one or more of these sensor module 102 components may be omitted, or one or more additional components may be added.

In view of the above discussion, it is apparent that various processing steps or other calculations recited herein may be capable of being performed by various embodiments of the system 10 disclosed herein, and are not necessarily limited to being performed by the sensor module 102, depending on the configuration of a particular embodiment of the present invention. For example, any of the processing steps or other calculations recited herein may be performed, in various embodiments, by the sensor module 102, by a server computer 604, by an electronic device 400, and/or any other network component, or by more than one component.

Embodiments of the present invention may involve the use of so-called "cloud computing." Cloud computing may include the delivery of computing as a service rather than a product, whereby shared resources, software, and information are provided to computers and other devices as a utility over a network (typically the Internet). Cloud computing may entrust services (typically centralized) with an individual's 100 data, software and computation on a published application programming interface over a network. End users may access cloud-based applications through a web browser or a light weight desktop or mobile app while the business software and data are stored on servers at a remote location. Cloud application providers often strive to give the same or better service and performance than if the software programs were installed locally on end-user computers.

In some embodiments, the transceiver 122 may be a two-way communication transceiver 122, while in other embodiments the transceiver 122 may be a one-way transmitter or a one-way receiver.

The user interface 136 of the sensor module 102 may be used by the individual 100 to interact with the sensor module 102. In some embodiments, the user interface 136 may include one or more input buttons, switches, or keys, including virtual buttons, switches, or keys of a graphical user interface touch screen surface. The function of each of these buttons, switches, or keys may be determined based on an operating mode of the sensor module 102. In one embodiment, the user interface 136 may include a touch pad, scroll pad and/or touch screen. In another embodiment, the user interface 136 may include capacitance switches. In a further embodiment, the user interface 136 may include voice-activated controls.

In some embodiments, however, the sensor module 102 may not include a user interface 136. In these embodiments, the sensor module 102 may be capable of communicating with other components of the system 10 which may themselves include user interfaces, for example, electronic device 400.

The angular momentum sensor 124, which may be, for example, a gyroscope, may be adapted to measure the angular momentum or orientation of the sensor module 102. Accordingly, when the sensor module 102 is physically coupled to user 100, the angular momentum sensor 124 may be capable of measuring the angular momentum or orientation of the user. In one embodiment, the angular momentum sensor 124 may be a tri-axial gyroscope that is capable of measuring angular rotation about three orthogonal axes. In other embodiments one, two, three, or more separate gyroscopes may be used. In some embodiments, the angular momentum sensor 124 may be used to calibrate measurements made by one or more of the acceleration sensor 116 and the magnetic field sensor 146.

The heart rate sensor 126 may be adapted to measure an individual's 100 heart rate. The heart rate sensor 126 may be placed in contact with the individual's 100 skin, such as the skin of the individual's chest, and secured with a strap. The heart rate sensor 126 may be capable of reading the electrical activity the individual's 100 heart.

The temperature sensor 128 may be, for example, a thermometer, a thermistor, or a thermocouple that measures changes in the temperature. In some embodiments, the temperature sensor 128 may primarily be used for calibration other sensors of the system 10, for example, the acceleration sensor 116 and the magnetic field sensor 146.

In one embodiment, the position receiver 130 may be an electronic satellite position receiver that is capable of determining its location (i.e., longitude, latitude, and altitude) using time signals transmitted along a line-of-sight by radio from satellite position system satellites. Known satellite position systems include the GPS system, the Galileo system, the BeiDou system, and the GLONASS system. In another embodiment, the position receiver 130 may be an antenna that is capable of communicating with local or remote base stations or radio transmission transceivers such that the location of the sensor module 102 may be determined using radio signal triangulation or other similar principles. In some embodiments, position receiver 130 data may allow the sensor module 102 to detect information that may be used to measure and/or calculate position waypoints, time, location, distance traveled, speed, pace, or altitude.

The data port 132 may facilitate information transfer to and from the sensor module 102 and may be, for example, a USB port. In some exemplary embodiments, data port 132 can additionally or alternatively facilitate power transfer to a power source, in order to a charge power source.

The timer 134 may be a clock that is capable of tracking absolute time and/or determining elapsed time. In some embodiments, the timer 134 may be used to timestamp certain data records, such that the time that certain data was measured or recorded may be determined and various timestamps of various pieces of data may be correlated with one another.

In some embodiments, the sensor module 102 may also include a button and/or a display. The button may serve as the user interface of the sensor module 102. The button may be capable of turning the sensor module 102 on and off, toggling through various display options, or serving a variety of other functions. Alternatively, multiple buttons or no buttons may be provided. In one embodiment, the display may be a relatively simple LED display that is capable of conveying the status or battery life of the sensor module 102 to an individual 100 with different color combinations or flashing patterns, for example. In another embodiment, the display may be a more advanced display that is capable of displaying performance parameter information, feedback, or other information to the individual 100, such as a segmented LCD display. Alternatively, no button or display may be provided.

In other embodiments, the sensor module 102 may include audio controls such as a speaker and/or microphone for audio communication with an individual 100. These components may serve as the user interface of the sensor module 102, and may be included an audio input system. These audio controls may be capable of turning the sensor module 102 on and off, toggling through various display options, or serving a variety of other functions. In one embodiment, the audio controls may be capable of conveying the status or battery life of the sensor module 102 to an individual 100. In another embodiment, the audio controls may be capable of outputting or receiving performance parameter information, feedback, or other information to and from the individual 100. In one embodiment, the audio controls may be capable of accepting voice commands form the individual 100. In another embodiment, the sensor module 102 may be capable of relaying audio information to an individual wirelessly via another device, such as a pair of headphones. Alternatively, audio controls may be provided.

Data obtained by the sensor module 102 may be processed in a variety of ways to yield useful information about the motion of an object of interest during the activity, e.g., individual 100. In some embodiments, sensor module 102 data may be processed to monitor changes in the spatial orientation of the individual's 100 body or a piece of the individual's 100 athletic equipment. In other embodiment, sensor module 102 data may be processed to by reference to a predetermined correlation between movement data and a characteristic stored in a data structure.

In some embodiments, sensor modules 102 are used to detect changes in an individual's direction of motion. Sensor modules 102 according to the present invention can also be worn by individuals and used to detect and/or track other motions such as, for example, motions associated with push-ups, pull-ups, weightlifting, diving, gymnastics, et cetera.

Figure 4:
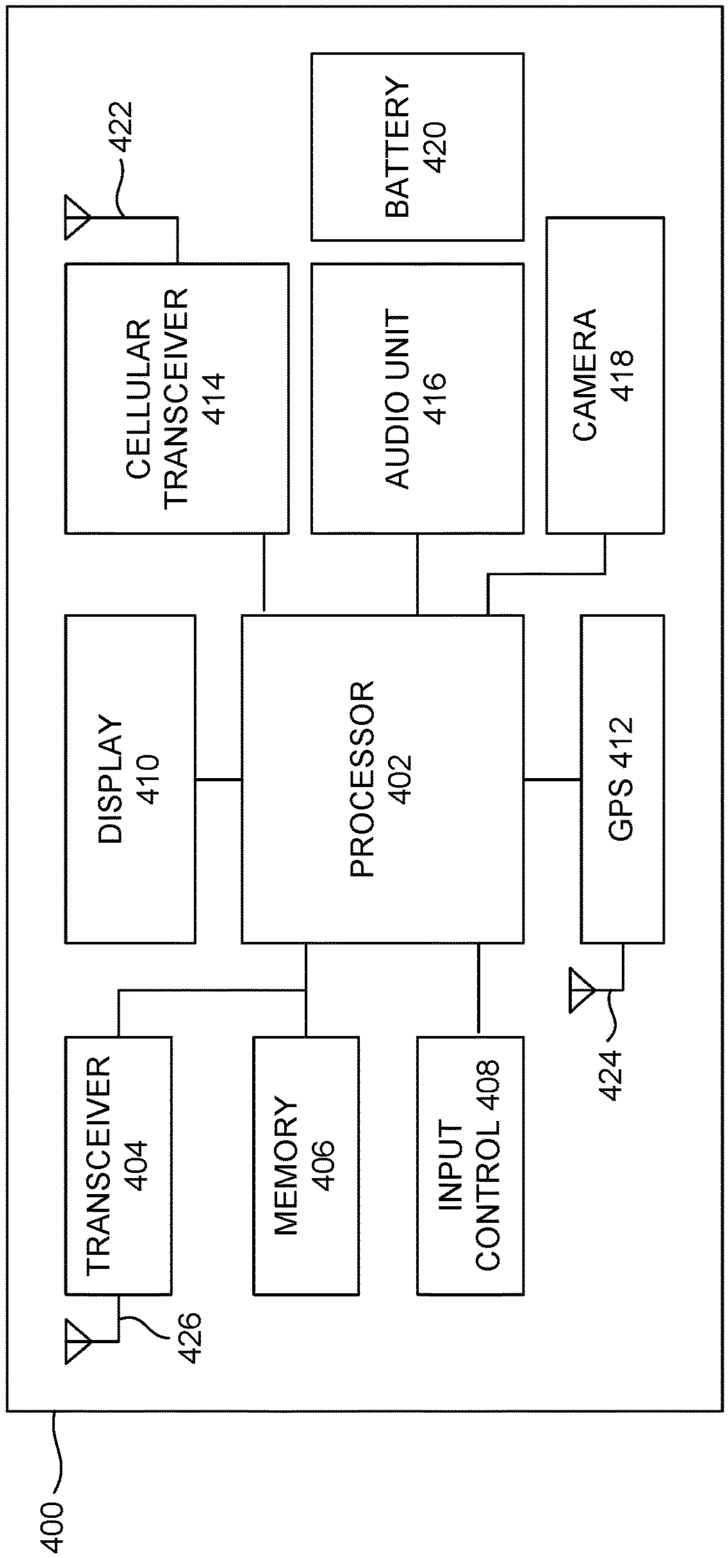
FIG. 4 is an example electronic device useful for implementing various embodiments.

Turning to FIG. 4, a block diagram of electronic device 400 according to an embodiment of the present invention is shown. In an embodiment, electronic device 400 corresponds to a mobile computing device, mobile phone, desktop computer, tablet computer, dedicated electronic device, or the like. As shown in FIG. 4, electronic device 400 may include a processor 402, memory 406, a user input control 408, a display 410, an audio unit 416, a transceiver 404, a cellular transceiver 414, an optional satellite-based positioning system receiver 412, a camera 418, and a battery 420.

Processor 402 is a processor capable of implementing application programs or software platforms 1000 stored in memory 406. Processor 402 is also capable of implementing digital signal processing algorithms. Processor 402 is coupled to memory 304, user input control 408, display 410, audio unit 416, transceiver 404, and may include a cellular transceiver 414.

Memory 406 is used to store application program instructions (e.g., software platform 1000) and data. In an embodiment, memory 406 stores programs, for example, used to implement all of the functionality of a typical electronic device. In an embodiment, memory 406 includes both read only memory and random access memory.

User input control 408 is used by an individual to interact with electronic device 400. In an embodiment, user input control 408 includes a variety of input buttons and/or keys. The function of each of these buttons and/or keys is typically determined based on an operating mode of electronic device 400. In one embodiment, user input control 408 includes a touch pad or scroll pad and/or touch screen buttons.

Display 410 is used to display information to an individual. In an embodiment, display 410 is a liquid crystal display.

Camera 418 is a small digital camera used to take digital photos or video. In one embodiment, camera 418 is a CCD camera. In another embodiment, camera 418 is a CMOS camera.

Audio unit 416 is used to process audio signals. In an embodiment, voice signals picked up using a microphone are converted to digital signals so that they can be operated upon, for example, by processor 402. Audio unit 416 also converts, for example, digital audio signals into amplified analog audio signals that can be used to drive one or more speakers. In an embodiment, audio unit 416 implements signal processing algorithms such as those available from Dolby Laboratories, Inc., which enhance the quality of music.

Transceiver 404 is a low-power transceiver used to communicate with other components of system 10. In an embodiment, transceiver 404 operates in an unlicensed frequency band such as 2.4 GHz. Transceiver 404 is coupled to an antenna 314. As used herein, the term transceiver means a combination of a transmitter and a receiver. In an embodiment, the transmitter and the receiver are integrated and form, for example, a part of an intergraded circuit.

Cellular transceiver 414 may be used to send and receive, for example, voice cellular telephone signals. Transceiver 414 can also be used to exchange information with a computer network such as, for example, the Internet. Cellular transceiver 414 is coupled to an antenna 422. As used herein, the term cellular transceiver means a combination of a cellular transmitter and a cellular receiver. In an embodiment, the transmitter and the receiver are integrated together into a single device.

In one embodiment, cellular transceiver 414 is used to send data described herein to a location where it is analyzed, for example, by a professional trainer. The professional trainer can call or text message the individual and provide the individual substantially real-time feedback based on the data. If the individual wants to call the professional trainer, for example, during a workout, the individual can place a call to the professional trainer, for example, by tapping electronic device 400 to place a call to a stored telephone number. In one embodiment, tapping electronic device 400 sends a text message to the professional trainer requesting that the professional trainer call the individual. These functions may also be included in sensor module 102.

Battery 420 is used to provide power to operate the various components of electronic device 400. In an embodiment, battery 420 is recharged periodically using a power adapter that plugs into a typical household power outlet. Battery 420 can also be a non-rechargeable battery.

In an embodiment, electronic device 400 also includes an optional satellite-based positioning system (e.g., global positioning system (GPS) or Galileo system) receiver 412. This enables the electronic device to determine its location anywhere on the earth. The satellite-based positioning system (e.g., GPS) receiver 412 is coupled to an antenna 424. In an embodiment, GPS receiver 412 enables the electronic device 400, for example, to provide navigational instructions to a runner using the device. The directions for a running route can be downloaded to the electronic device prior to a run and stored in memory 406. In addition to navigational instructions, attributes about the running route such as, for example, whether the route has sidewalks, is on a trail, is located within a safe neighborhood, et cetera, can also be downloaded and viewed. GPS receiver 412 can be used, in an embodiment, to track a route run by a runner. The route can be saved in memory 304 and viewed by the runner after the run. The route can also be shared with other runners, for example, by posting the route on a computer/web server for down-loading by other runners.

In an embodiment, GPS receiver 412 and information stored in the memory of electronic device 400 (or information received, e.g., from the internet using cellular transceiver 414) are used to provide navigational instructions, for example, to a runner. In an embodiment, the runner can enter into electronic device 400 that he or she would like to run five kilometers, for example, and the electronic device will automatically select/map-out an appropriate route and provide navigation instructions to the runner during the run. In an embodiment, the runner can specify both a start point and a stop point for the run. In an embodiment, only one point is specified, which serves as both the start point and the stop point. In an embodiment, the start and stop points are the point at which the runner is standing (e.g., as determined by GPS receiver 412) when the runner enters, for example, that he or she would like to run five kilometers.

In an embodiment, electronic device 400 includes a radio. The radio can be an AM only radio, an FM only radio, or both an AM and FM radio. In an embodiment, the radio is controlled using soft keys presented to an individual on display 410.

In one embodiment, electronic device 400 includes optional sensors (not shown) for detecting selected weather related data such as, for example, temperature, humidity, ultra-violet radiation and/or barometric pressure. This data can be used, for example, to determine how an individual's performance is effected by environmental factors.

In one embodiment, an electronic device according to the present invention does not include a display. In this embodiment, information such as, for example, performance and/or feedback information is provided to an individual audibly during a workout, e.g., through sensor module 102, or other audio feedback. The information can be display to the individual, for example, after the workout using a computer display once the information has been transferred to the computer. In an embodiment, the information can be transferred to a second processing device such as, for example, a sports watch during the workout and displayed to the individual during the workout on the display of the second processing device.

In embodiments, an electronic device 400 according to the present invention can be formed, for example, by attaching a dongle (e.g., a small hardware device that protects software) to a conventional phone, a music file player, a personal digital assistant, et cetera. The dongle includes, for example, downloadable software that implements some or all of the sport functions described herein. In an embodiment, the software includes a sport user interface written in the Java programming language. In an embodiment, the software includes drivers, for example, that enable the software to be used with any ultra low power Bluetooth communications protocol compatible device. Other embodiments are compatible with other communications protocol compatible devices.

In an embodiment of the present invention, a electronic device according to the present invention is a dedicated device (rather than a device such as, for example, a phone, a music file player, or a personal digital assistant) that implements the functions as detailed herein.

In some embodiments, the sensor module 102 may then determine that the movement of an individual 100 indicates the occurrence of a movement to track. In one embodiment, the determination that the movement of the individual 100 indicates the occurrence of a movement to track occurs when a threshold data value is met for a predetermined period of time. For example, the sensor module 102 may determine that a movement of the individual has resulted in a threshold acceleration occurring for a predetermined period of time.

In some embodiments, remote processing may be used to augment the processing discussed herein. The remote processing may enable a sensor module 102 to wirelessly transmit data to a remote computer for processing. Wireless communication with other elements of the system 10 is generally described above. In this way, the processing capabilities of the system 10 may be enhanced by shifting certain processing and analytical tasks to a remotely located computer, such as a server computer, with greater computational abilities and, in some embodiments, access to additional data or other resources.

In some embodiments, the data received may be transmitted to the remote computer during the athletic activity. In another embodiment, the data received may be transmitted to the remote computer after the athletic activity has been completed.

In some embodiments, the physiological data received may be compared to data associated with the individual 100 for the present athletic activity and data associated with the individual 100 from a previous athletic activity. In some embodiments, the data may be compared to data received during a different individual's 100 athletic activity.

By using the system 10 including the sensor module 102 described above, embodiments of the present invention may advantageously enable the individual 100 (or their coach, teammate, a spectator, friends, competitors, etc.) to obtain this or other information about the motion of the individual's 100 body, or other information related to the health, nutrition, wellness, mindset, etc. of the individual 100 during or after the course of the athletic activity.

For running, sensor module 102 embodiments such as those described above may enable an individual 100, to determine, for example, characteristics of a runner's motion. For example, a sensor module 102 could be used to determine the speed, pace, distance traversed, locations traversed, or to discriminate between different surfaces (e.g., grass, street, or trail) and inclinations (e.g., uphill, flat, or downhill). In some embodiments the sensor module 102 may be mounted, for example, on a runner's torso, arm, hand, leg, foot, or head, or on or in their article of footwear, or integrated into electronic device 400.

In some embodiments of the present invention, the sensor module 102 may be capable of compensating for inherent deficiencies that may be present for various types of sensor contained within or in communication with the sensor module 102. Most real world sensors have limitations. For example, accelerometers, magnetometers, and gyroscopes may have accuracy issues, particularly when used at speeds of motion of the individual 100 or under other conditions that differ from their initial calibration conditions.

In some embodiments of the present invention, the sensor module 102 may communicate with other components of the system 10 via wired or wireless technologies. Communication between the sensor module 102 and other components of the system 10 may be desirable for a variety of reasons.

For example, to the extent that the sensor module 102 records and stores athletic activity information, it may be useful to transmit this information to another electronic device for additional data processing, data visualization, sharing with others, comparison to previously recorded athletic activity information, or a variety of other purposes. As a further example, to the extent that the sensor module 102 has insufficient processing power, wide area network transmission capabilities, sensor capabilities, or other capabilities, these capabilities can be provided by other components of the system 10. With this in mind, possible communications means are described briefly below.

Figure 5:
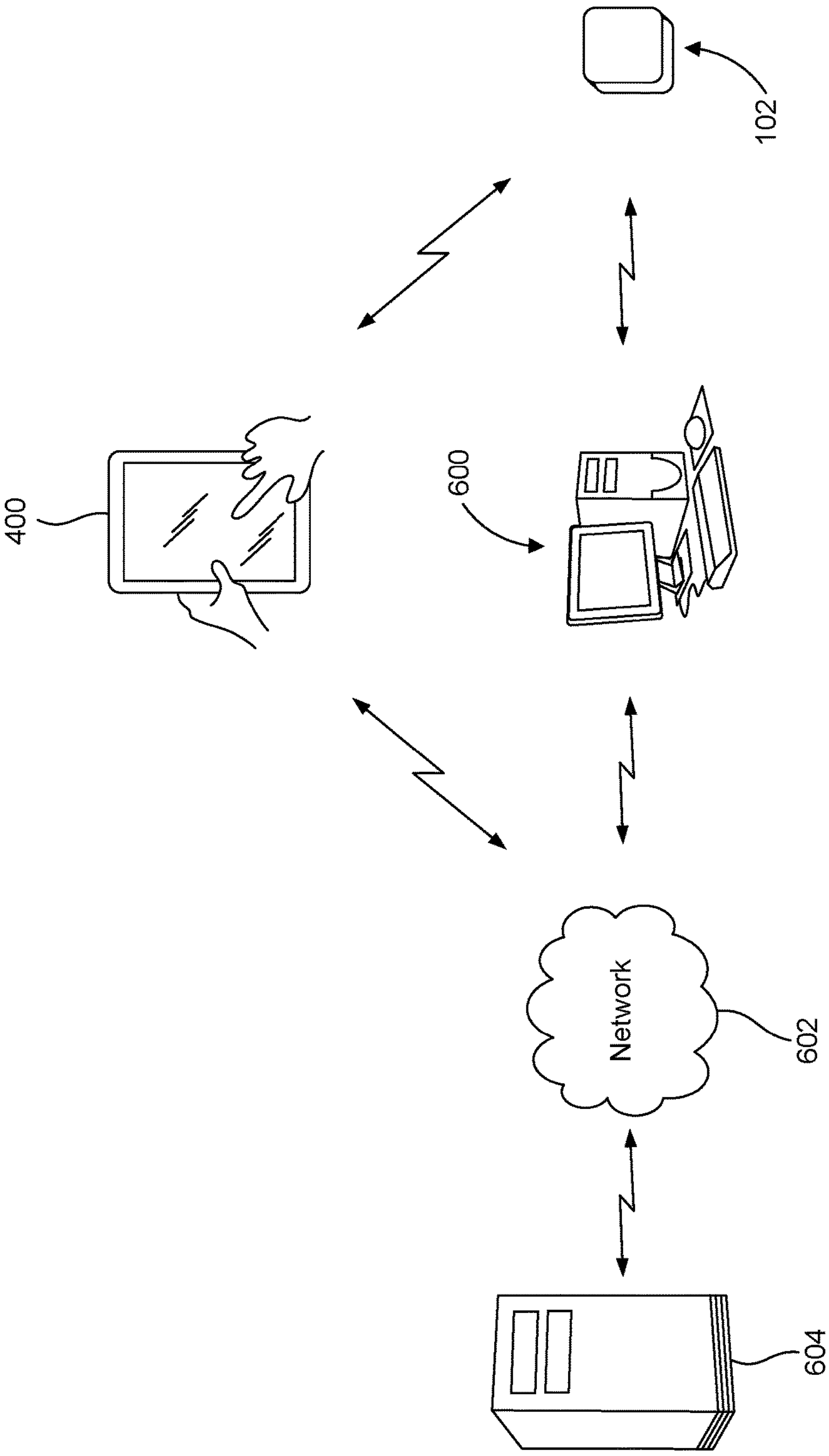
FIG. 5 shows a representative communication system useful for implementing various embodiments.

FIG. 5 is a diagram of a sensor module interacting with one of an electronic device, a standalone device, a network, and a server according to an embodiment of the present invention.

Transceiver 112 may allow sensor module 102 to communicate, for example, with other locally or remotely located individuals 100, or other standalone devices 600, via network 602, or server 604, for example, as shown in FIG. 5. Communication between these components may be one way communication or two way communication.

Communication may also occur between the sensors, electronic device, and/or a remote server 604 via a network 602, for example, as shown in FIG. 5. In some embodiments, the network is the Internet. The Internet is a worldwide collection of servers, routers, switches and transmission lines that employ the Internet Protocol (TCP/IP) to communicate data. The network may also be employed for communication between any two or more of the sensors, the electronic device, the server, etc. In some embodiments of the present invention, information is directly communicated between the sensors or processor and the server via the network, thus bypassing the electronic device.

A variety of information may be communicated between any of the components that may transmit or receive data or information. Such information may include, for example, performance parameter data, device settings (including sensor settings), software, and firmware.

Communication among the various elements of the present invention may occur after a workout/athletic activity, or other experience has been completed or in substantially real-time during the workout/athletic activity, or other experience.

The electronic device 400 may serve a variety of purposes including, for example, providing additional data processing, providing instructions to individual 100; providing additional data storage, providing data visualization, providing additional sensor capabilities, relaying information to a network 602, providing for the playback of music or videos, or the like.

The electronic device 400 illustrated in the figures may not be a dedicated electronic monitoring device; the electronic device 400 illustrated in the figures may be a mobile phone, dedicated fitness monitor, smart watch, tablet computer, etc. In alternate embodiments, it may be possible for the sensor module 102 itself to be embodied by a mobile phone, or for the electronic device 400 to be a mobile phone. Including an electronic device 400 in the system 10, such as a mobile phone, may be desirable as mobile phones are commonly carried by individuals 400, even when engaging in athletic activities, and they are capable of providing significant additional computing and communication power at no additional cost to the individual 100.

Wired communication between the sensor module 102 and an electronic device 400 may be achieved, for example, by placing the sensor module 102—or a piece of athletic equipment or electronic device 400 including the sensor module 102—in a docking unit that is attached to the electronic device 400 using a communications wire plugged into a communications port of the electronic device 400. In another embodiment, wired communication between the sensor module 102 and the electronic device 400 may be achieved, for example, by connecting a cable between the sensor module 102—or a piece of athletic equipment or electronic device 400 including the sensor module 102—and the computer or standalone device 600. The data port 132 of the sensor module 102 and a communications port of the computer 600 may include USB ports. The cable connecting the sensor module 102 and the computer 600 may be a USB cable with suitable USB plugs including, but not limited to, USB-A or USB-B regular, mini, or micro plugs, or other suitable cable such as, for example, a FireWire, Ethernet or Thunderbolt cable. As previously explained above, in some embodiments, such cables could be used to facilitate power transfer to a power source of the sensor module 102, in order to charge the power source. Alternatively, the power source may be recharged by inductive charging, or by using a docking station with a charging base.

Wired connection to an electronic device 400 may be useful, for example, to upload athletic activity information from the sensor module 102 to the electronic device 400, or to download application software updates or settings from the electronic device 400 to the sensor module 102.

Wireless communication between the sensor module 102- or a piece of athletic equipment or electronic device 400 including the sensor module 102—and the electronic device 400 may be achieved, for example, by way of a wireless wide area network (such as, for example, the Internet), a wireless local area network, or a wireless personal area network. As is well known to those skilled in the art, there are a number of known standard and proprietary protocols that are suitable for implementing wireless area networks (e.g., TCP/IP, IEEE 802.16, Bluetooth, Bluetooth low energy, ANT, ANT+ by Dynastream Innovations, or BlueRobin). Accordingly, embodiments of the present invention are not limited to using any particular protocol to communicate between the sensor module 102 and the various elements of the system 10 of the present invention.

In one embodiment, the sensor module 102—or a piece of athletic equipment or electronic device 400 including the sensor module 102—may communicate with a wireless wide area network communications system such as that employed by mobile telephones. For example, a wireless wide area network communication system may include a plurality of geographically distributed communication towers and base station systems. Communication towers may include one or more antennae supporting long-range two-way radio frequency communication wireless devices, such as sensor module 102. The radio frequency communication between antennae and the sensor module 102 may utilize radio frequency signals conforming to any known or future developed wireless protocol, for example, CDMA, GSM, EDGE, 3G, 4G, IEEE 802.x (e.g., IEEE 802.16 (WiMAX)), etc. The information transmitted over-the-air by the base station systems and the cellular communication towers to the sensor module 102 may be further transmitted to or received from one or more additional circuit-switched or packet-switched communication networks, including, for example, the Internet.

As previously noted, in some embodiments of the present invention, sensor module 102 may communicate with an electronic device, such as a smart phone, that is also carried by the individual 100 during the athletic activity or experience.

In some embodiments of the present invention, for example, as shown in FIG. 4, the electronic device 400 may take the form of a mobile phone and may include at least a processor, a memory, user input controls, a positioning system receiver, a wireless wide area network (WWAN) transceiver, a visual display, and an audio unit. A visual display in the form of a LCD screen, and user input controls in the form of a physical keyboard and a scroll ball may be present. Individual 100 may carry electronic device 400 during an activity, such that data is transmitted while carried by the individual. As used herein, "carry" may include that the electronic device 400 is worn (e.g., as a smart watch, incorporated into a garment, or other accessory), or mounted to a piece of equipment (e.g., connected to a bicycle, or contained within a bag carried by the individual 100).

The memory of the electronic device 400 may be adapted to store application programs, software platforms or modules, used to implement aspects of the functionality of the system 10 described herein. Alternatively, those of skill in the art will understand that all or part of the software may be stored on the server 604 and accessed over the network 602 and run remotely as a mobile web application, or stored locally in electronic device 400, having a memory.

Those skilled in the art will appreciate that alternative or additional software modules and sub-modules may be implemented in order to provide or extend the described or additional functionalities to the individual 100 using the electronic device 400. For example, the software configuration of software stored on an electronic device 400 may include a device operating system, which may be one of the commercially available mobile phone operating systems such as, for example, BlackBerry OS, iPhone OS, Windows Mobile, Symbian, LINUX, WebOS, or Android. The device operating system may also have an associated application programming interface through which middleware and application programs may access the services of the operating system.

The various modules of the system 10 of the present invention may support GUIs through which an individual 100 can interact with the system 10 using the electronic device 400 just prior to and/or during an activity. As will be appreciated by those of skill in the art, in one embodiment the GUIs may be supported by a mobile device application being run on the electronic device 400. In another embodiment, the GUIs may appear as web pages provided by the server 604 via a website that may be accessible to the individual 100 over the network 602 using a web browser on their electronic device 400. The GUIs may be considered to be part of the methods or systems of the present invention.

In some embodiments, the system 10 may be sold as a package, including an electronic device 400, sensor modules 102 for multiple individuals 100, and a charger.

System 10 may recognize and record repeat usage of the system 10 over time, number of times various individuals store their data into a profile and update that data. The system 10 may also be able to integrate with various social media platforms, allowing individuals to share with their social network data regarding their gait characteristics, their usage of the system 10.

Figure 6:
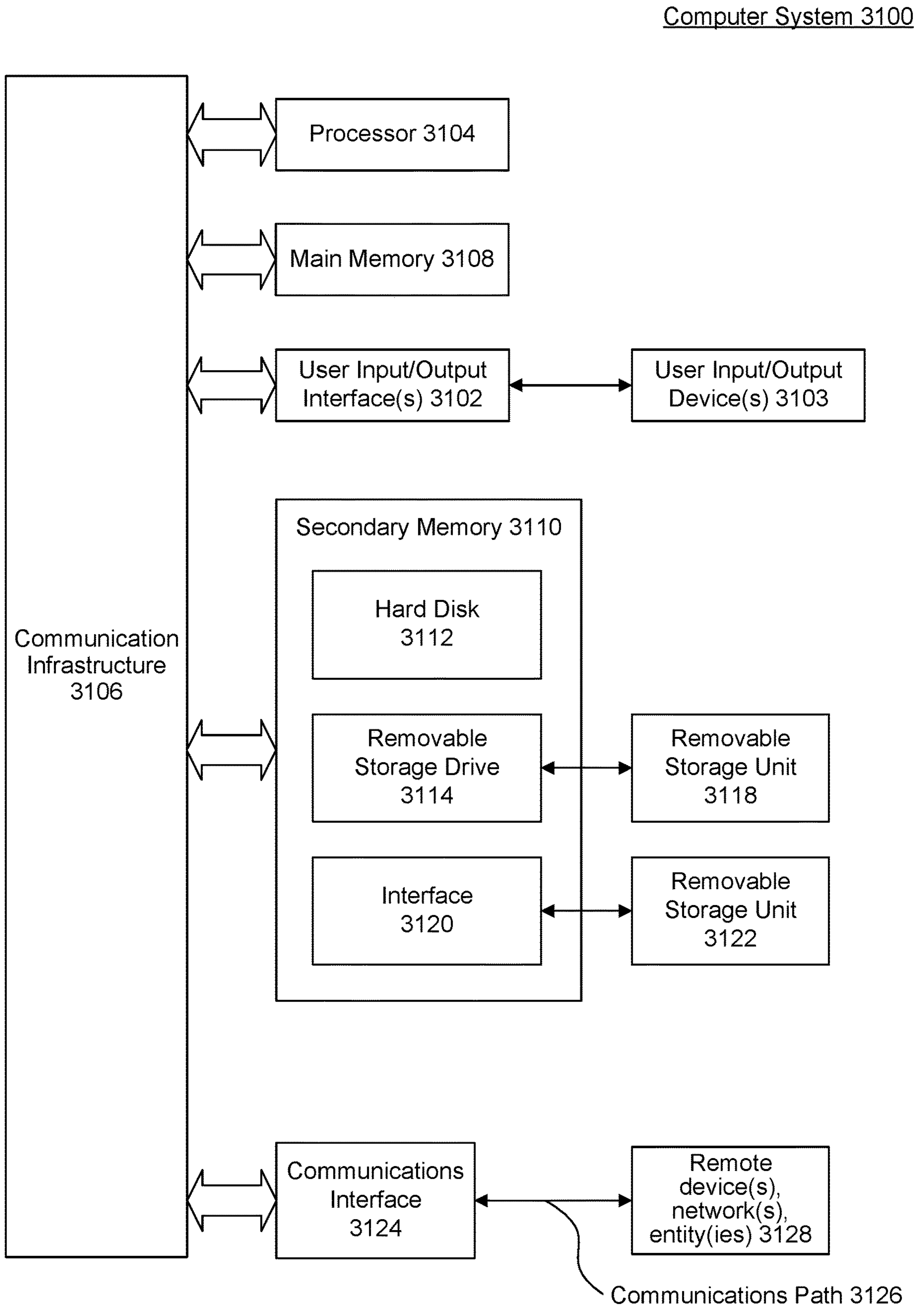
FIG. 6 is an example computer system useful for implementing various embodiments.

Embodiments can be implemented, for example, using one or more well-known computer systems or one or more components included in computer system 3100 shown in FIG. 6. Computer system 3100 can be any well-known computer capable of performing the functions described herein, including electronic device 400.

Computer system 3100 includes one or more processors (also called central processing units, or CPUs), such as a processor 3104. Processor 3104 is connected to a communication infrastructure or bus 3106.

One or more processors 3104 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 3100 also includes user input/output device(s) 3103, such as monitors, keyboards, pointing devices, etc., that communicate with communication infrastructure 3106 through user input/output interface(s) 3102.

Computer system 3100 also includes a main or primary memory 3108, such as random access memory (RAM). Main memory 3108 may include one or more levels of cache. Main memory 3108 has stored therein control logic (i.e., computer software) and/or data.

Computer system 3100 may also include one or more secondary storage devices or memory 3110. Secondary memory 3110 may include, for example, a hard disk drive 3112 and/or a removable storage device or drive 3114. Removable storage drive 3114 may be a floppy disk drive, a magnetic tape drive, a compact disk drive, an optical storage device, tape backup device, and/or any other storage device/drive.

Removable storage drive 3114 may interact with a removable storage unit 3118. Removable storage unit 3118 includes a computer usable or readable storage device having stored thereon computer software (control logic) and/or data. Removable storage unit 3118 may be a floppy disk, magnetic tape, compact disk, DVD, SD-Card, optical storage disk, and/or any other computer data storage device. Removable storage drive 3114 reads from and/or writes to removable storage unit 3118 in a well-known manner.

According to an exemplary embodiment, secondary memory 3110 may include other means, instrumentalities or other approaches for allowing computer programs and/or other instructions and/or data to be accessed by computer system 3100. Such means, instrumentalities or other approaches may include, for example, a removable storage unit 3122 and an interface 3120. Examples of the removable storage unit 3122 and the interface 3120 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 3100 may further include a communication or network interface 3124. Communication interface 3124 enables computer system 3100 to communicate and interact with any combination of remote devices, remote networks, remote entities, etc. (individually and collectively referenced by reference number 3128). For example, communication interface 3124 may allow computer system 3100 to communicate with remote devices 3128 over communications path 3126, which may be wired and/or wireless, and which may include any combination of LANs, WANs, the Internet, etc. Control logic and/or data may be transmitted to and from computer system 3100 via communication path 3126.

In an embodiment, a tangible apparatus or article of manufacture comprising a tangible computer useable or readable medium having control logic (software) stored thereon is also referred to herein as a computer program product or program storage device. This includes, but is not limited to, computer system 3100, main memory 3108, secondary memory 3110, and removable storage units 3118 and 3122, as well as tangible articles of manufacture embodying any combination of the foregoing. Such control logic, when executed by one or more data processing devices (such as computer system 3100), causes such data processing devices to operate as described herein.

In some embodiments, the movement of the bodies of a plurality of individuals engaged in an athletic activity or experience and/or the movement of a plurality of pieces of athletic equipment used by the individuals during the athletic activity or experience may be monitored. In some embodiments, real-time monitoring and/or feedback may be provided, while in other embodiments post-activity feedback may be provided.

Figure 7:
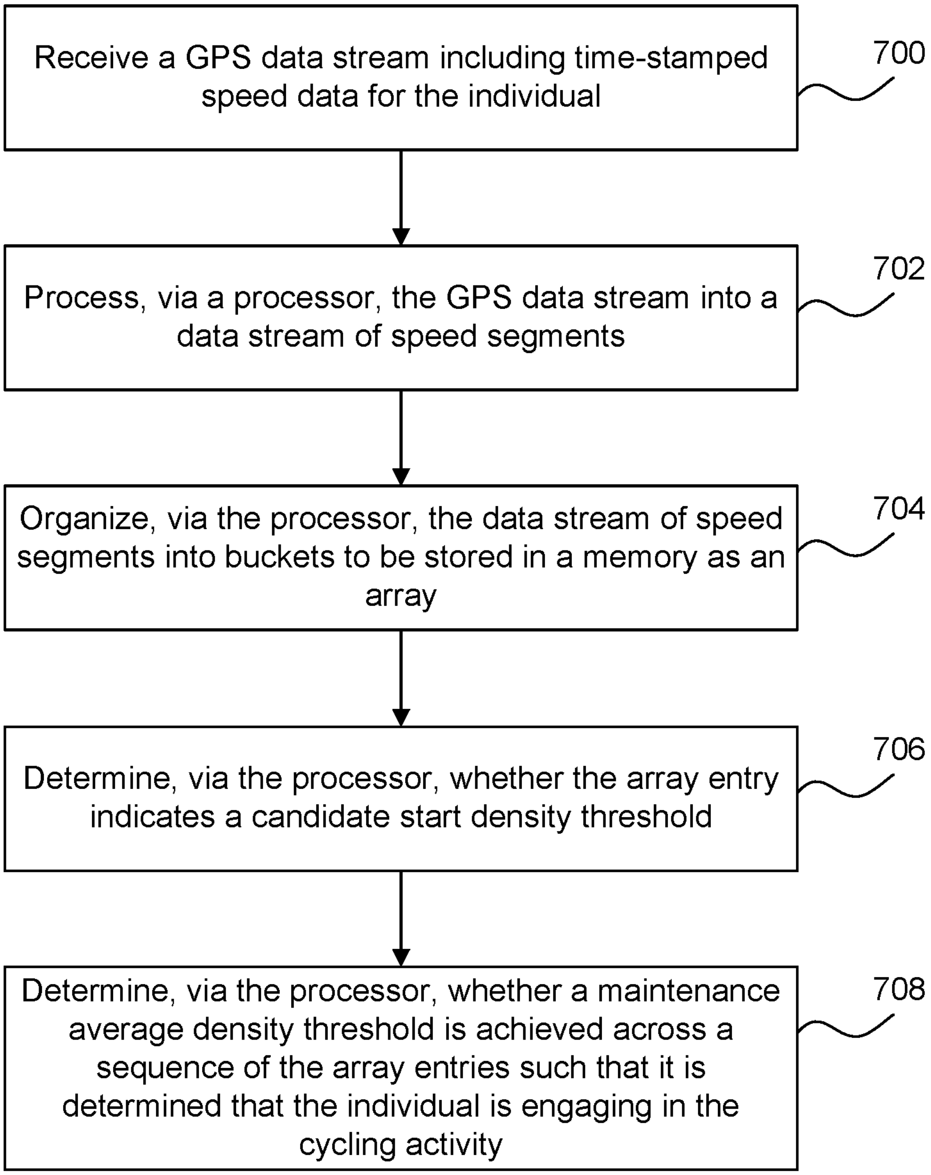
FIG. 7 is a flowchart illustrating a method for automatically detecting a cycling activity of an individual according to an embodiment.

Turning to FIG. 7, a flowchart illustrating a method for automatically detecting a cycling activity of an individual is shown. The method may include receiving a GPS data stream including time-stamped speed data for the individual at step 700, processing, via a processor, the GPS data stream into a data stream of speed segments at step 702. Next the method may include organizing, via the processor, the data stream of speed segments into buckets to be stored in a memory as an array at step 704. The method may include determining, via the processor, whether the array entry indicates a candidate start density threshold at step 706. The method may further include determining, via the processor, whether a maintenance average density threshold is achieved across a sequence of the array entries such that it is determined that the individual is engaging in the cycling activity at step 708.

Figure 8:
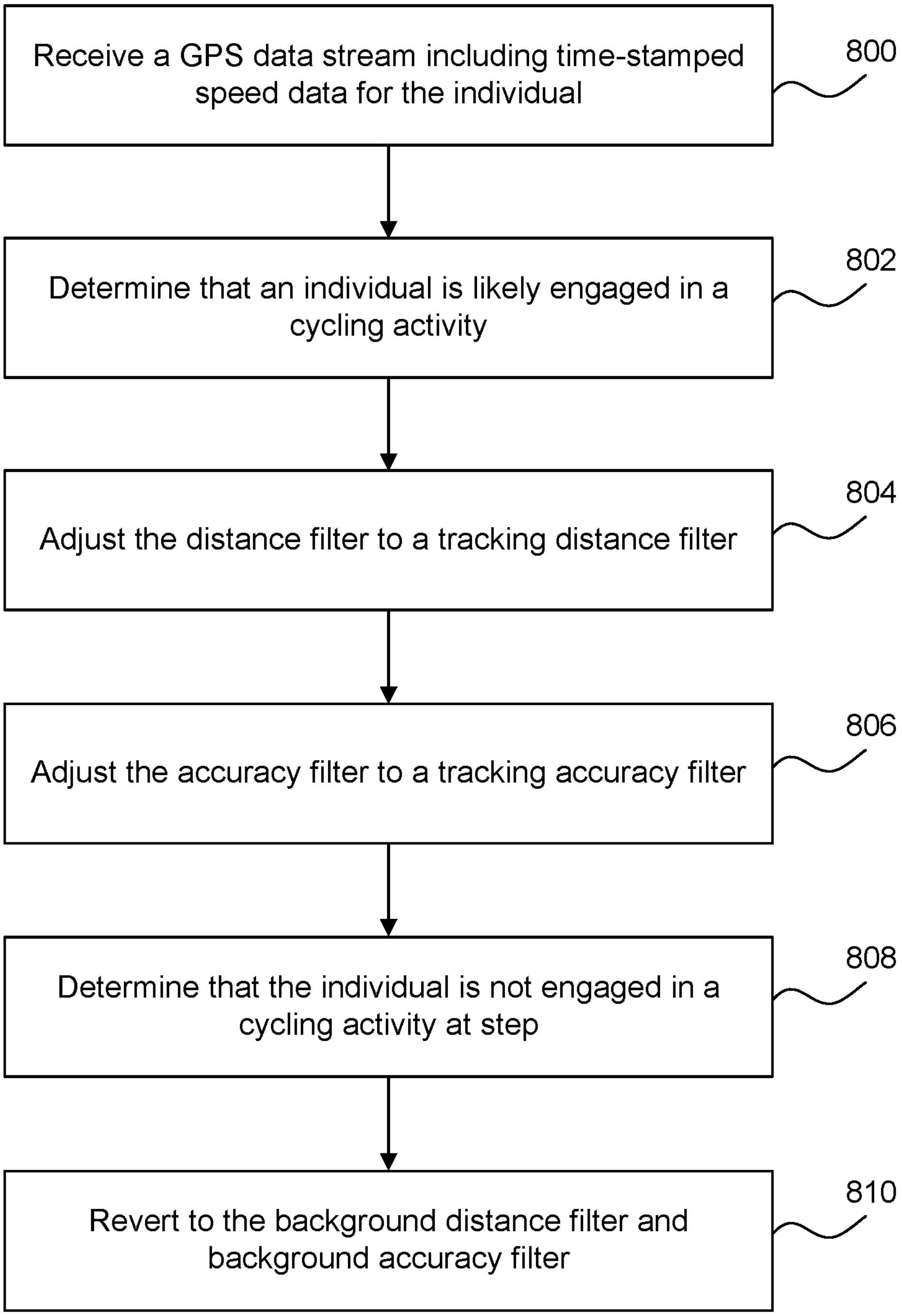
FIG. 8 is a flowchart illustrating a method for automatically detecting a cycling activity according to an embodiment.

FIG. 8 is a flowchart illustrating a method for automatically detecting a cycling activity. The method includes receiving a speed data stream at a background distance filter and a background accuracy filter at step 800. The method then may include determining that an individual is likely engaged in a cycling activity at step 802, adjusting the distance filter to a tracking distance filter at step 804, adjusting the accuracy filter to a tracking accuracy filter at step 806, determining that the individual is not engaged in a cycling activity at step 808; and reverting to the background distance filter and background accuracy filter at step 810.

Figure 9:
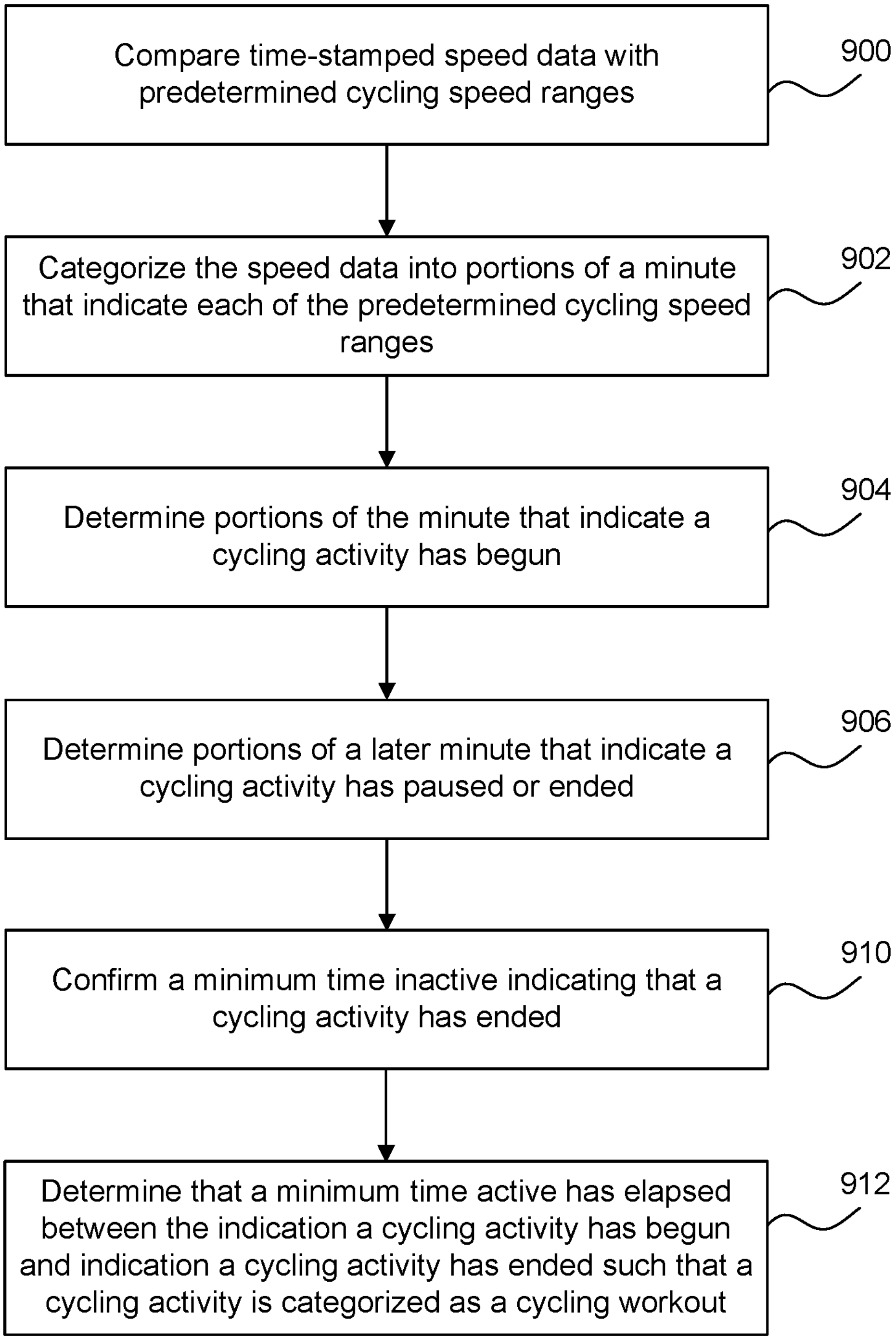
FIG. 9 is a flowchart illustrating a method for automatically detecting a cycling workout according to an embodiment.

FIG. 9 is a flowchart illustrating a method for automatically detecting a cycling workout. The method includes comparing time-stamped speed data with predetermined cycling speed ranges at step 900. The method may include categorizing the speed data into portions of a minute that indicate each of the predetermined cycling speed ranges at step 902, determining portions of the minute that indicate a cycling activity has begun at step 904, determining portions of a later minute that indicate a cycling activity has paused or ended at step 906, confirming a minimum time inactive indicating that a cycling activity has ended at step 910, and determining that a minimum time active has elapsed between the indication a cycling activity has begun and indication a cycling activity has ended such that a cycling activity is categorized as a cycling workout at step 912.

Various aspects of the present invention, or any parts or functions thereof, may be implemented using hardware, software, firmware, tangible non-transitory computer readable or computer usable storage media having instructions stored thereon, or a combination thereof and may be implemented in one or more computer systems or other processing systems.

Program products, methods, and systems of the present invention can include any software application executed by one or more electronic devices 400. An electronic device 400 can be any type of computing device having one or more processors. For example, the electronic device 400 can be a workstation, mobile device (e.g., a mobile phone, personal digital assistant, tablet computer, or laptop), computer, server, compute cluster, server farm, game console, set-top box, kiosk, embedded system, a gym machine, a retail system or retail enhancement system or other device having at least one processor and memory. Embodiments of the present invention may be software executed by a processor, firmware, hardware or any combination thereof in a computing device.

In this document, terms such as "computer program medium" and "computer-usable medium" may be used to generally refer to media such as a removable storage unit or a hard disk installed in hard disk drive. Computer program medium and computer-usable medium may also refer to memories, such as a main memory or a secondary memory, which can be memory semiconductors (e.g., DRAMs, etc.). These computer program products provide software to computer systems of the present invention.

Computer programs (also called computer control logic) may be stored on main memory and/or secondary memory. Computer programs may also be received via a communications interface. Such computer programs, when executed, may enable computer systems of the present invention to implement embodiments described herein. Where embodiments are implemented using software, the software can be stored on a computer program product and loaded into a computer system using, for example, a removable storage drive, an interface, a hard drive, and/or communications interface.

Based on the description herein, a person skilled in the relevant art will recognize that the computer programs, when executed, can enable one or more processors to implement processes described above, such as the steps in the methods illustrated by the figures. In some embodiments, the one or more processors can be part of a computing device incorporated in a clustered computing environment or server farm. Further, in some embodiments, the computing process performed by the clustered computing environment may be carried out across multiple processors located at the same or different locations.

Software of the present invention may be stored on any computer-usable medium. Such software, when executed in one or more data processing device, causes the data processing device to operate as described herein. Embodiments of the invention employ any computer-usable or -readable medium, known now or in the future. Examples of computer-usable mediums include, but are not limited to, primary storage devices (e.g., any type of random access or read only memory), secondary storage devices (e.g., hard drives, floppy disks, CD ROMS, ZIP disks, tapes, magnetic storage devices, optical storage devices, MEMS, nanotechnological storage devices, memory cards or other removable storage devices, etc.), and communication mediums (e.g., wired and wireless communications networks, local area networks, wide area networks, intranets, etc.).

The systems and methods described herein contemplate physical alteration of code or components, and transforming code or components such that the system or method is physically altered (e.g., creating a new data file, for example). The solutions provided herein may be rooted in technology, e.g., computer technology, and overcome problems related to physiological monitoring for example, that are unique to technological realms such as networking or software related issues with data processing. The systems and methods described herein additionally may contemplate additional elements beyond data relationships, such that the solutions tie process advantages to a particular device and increase performance of such a device (e.g., increasing processing efficiency, resolution for location based features, etc.).

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments of the system described with reference to the figures will so fully reveal the general nature of the invention that others can, by applying knowledge within the skill of the art, readily modify and/or adapt for various applications such specific embodiments, without undue experimentation, without departing from the general concept of the present invention.

While various embodiments of the present invention have been described above, they have been presented by way of example only, and not limitation. It should be apparent that adaptations and modifications are intended to be within the meaning and range of equivalents of the disclosed embodiments, based on the teaching and guidance presented herein. It therefore will be apparent to one skilled in the art that various changes in form and detail can be made to the embodiments disclosed herein without departing from the spirit and scope of the present invention. The elements of the embodiments presented above are not necessarily mutually exclusive, but may be interchanged to meet various needs as would be appreciated by one of skill in the art.

It is to be understood that the phraseology or terminology used herein is for the purpose of description and not of limitation. The breadth and scope of the present invention should not be limited by any of the above-described exemplary embodiments, but should be defined only in accordance with the following claims and their equivalents.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, the Examiner is also reminded that any disclaimer made in the instant application should not be read into or against the parent application.

What is claimed is:

1. A health and fitness monitoring method for automatically detecting a cycling activity, comprising:
- determining, on a portable electronic device, speed data related to an individual, wherein the portable electronic device comprises a processor, a user interface, and a positioning system;
- receiving a speed data stream at a background distance filter and a background accuracy filter, wherein the speed data stream is based on the speed data;
- determining speed variations based on the speed data stream;
- detecting patterns based on the determined speed variations;
- determining, based on the detected patterns, that an individual is likely engaged in a cycling activity;
- adjusting the background distance filter to a tracking distance filter;
- adjusting the background accuracy filter to a tracking accuracy filter;
- determining, based on the detected patterns, that the individual is not engaged in a cycling activity; and
- reverting to the background distance filter and background accuracy filter.

2. The method of claim 1, wherein the speed data stream is a GPS speed data stream.

3. The method of claim 2, wherein determining that the individual is likely engaged in a cycling activity comprises:
- receiving data corresponding to a speed of the individual;
- categorizing the speed of the individual as less than cycling activity, more than cycling activity, cycling activity, and possibly cycling activity;
- determining, based on the categorization, whether the individual is engaging in cycling activity; and
- determining, based on the categorization, whether a cycling activity should be categorized as a cycling workout.

4. The method of claim 3, wherein determining that the individual is likely engaged in a cycling activity comprises:
- converting the data corresponding to the speed of the individual into time-stamped speed segments;
- organizing the time-stamped speed segments into speed characterizations for a portion of a given minute; and comparing the speed characterizations of a given minute such that if a significant portion of the minute falls into a cycling speed characterization, identifying that a cycling activity is occurring at that minute.

5. The method of claim 4, wherein the cycling speed characterizations are automatically updated in response to one of the individual's historical data, machine learning algorithms, and individual confirmation of historical data.

6. The method of claim 1, further comprising:

determining that a minimum time active has elapsed between determining the individual has likely engaged in a cycling activity and determining an individual is not engaged in a cycling activity; and indicating that a cycling workout has occurred.

7. The method of claim 1, further comprising generating the speed data stream based on the determined speed data.

8. The method of claim 7, wherein:

the portable electronic device comprises a transceiver configured to transmit the speed data stream to a remote device; and the received speed data stream is received on the remote device.

9. The method of claim 1, further comprising:

providing a notification on a display of the portable electronic device in response to determining that an individual is likely engaged in a cycling activity.

10. The method of claim 1, further comprising:

categorizing the speed of the individual as a cycling activity, the categorizing comprising:

determining a portion of a minute that indicates a cycling activity has begun;

determining a portion of a later minute that indicates a cycling activity has paused or ended; and determining that a minimum time active has elapsed between the indication that a cycling activity has begun and the indication that a cycling activity has ended.

* * * * *